US008257629B2

(12) United States Patent
Ogura et al.

(10) Patent No.: US 8,257,629 B2

(45) Date of Patent: Sep. 4, 2012

(54) MANUFACTURING METHOD OF HONEYCOMB STRUCTURE

(75) Inventors: Yutaka Ogura, Inazawa (JP); Satoshi Yamada, Nagoya (JP); Hiroshi Kurachi, Aichi-county (JP)

(73) Assignee: NGK Insulators, Ltd., Nagoya (JP)

( * ) Notice: Subject to any disclaimer, the term of this patent is extended or adjusted under 35 U.S.C. 154(b) by 687 days.

(21) Appl. No.: 12/393,678

(22) Filed: Feb. 26, 2009

(65) Prior Publication Data

US 2009/0246452 A1 Oct. 1, 2009

(30) Foreign Application Priority Data

Mar. 27, 2008 (JP) ................................ 2008-083269
Dec. 10, 2008 (JP) ................................ 2008-314117

(51) Int. Cl.
*B29C 47/00* (2006.01)

(52) U.S. Cl. .................................. 264/177.12; 264/630

(58) Field of Classification Search .................. 264/630, 264/631

See application file for complete search history.

(56) References Cited

U.S. PATENT DOCUMENTS

| | | | | |
|---|---|---|---|---|
| 6,939,522 | B1 * | 9/2005 | Harada et al. | 422/211 |
| 2003/0140608 | A1 * | 7/2003 | Hamanaka et al. | 55/523 |
| 2005/0166729 | A1 | 8/2005 | Nishio et al. | |
| 2008/0006971 | A1 * | 1/2008 | Kawai et al. | 264/630 |
| 2008/0203626 | A1 * | 8/2008 | Ohno et al. | 264/630 |

FOREIGN PATENT DOCUMENTS

| | | | |
|---|---|---|---|
| EP | 1 153 643 | A1 | 11/2001 |
| EP | 1 283 067 | A1 | 2/2003 |
| EP | 1 413 345 | A1 | 4/2004 |
| EP | 2 108 436 | A1 | 10/2009 |
| EP | 2 138 290 | A2 | 12/2009 |
| JP | A-2003-291054 | | 10/2003 |
| JP | A-2005-172652 | | 6/2005 |

OTHER PUBLICATIONS

European Search Report issued in European Patent Application No. 09 25 0702.9 dated Apr. 21, 2011.

* cited by examiner

*Primary Examiner* — Matthew Daniels
*Assistant Examiner* — Erin Snelting
(74) *Attorney, Agent, or Firm* — Oliff & Berridge, PLC

(57) ABSTRACT

A manufacturing method of a honeycomb structure that can improve a manufacturing efficiency and a raw material yield is provided. There is provided a manufacturing method of a honeycomb structure comprising: subjecting a raw material to extrusion forming to form a honeycomb formed body 100 having a partition wall that partitions a plurality of cells that serve as flow paths for a fluid and are extended from one end surface to the other end surface; forming a plurality of notches extended in a direction along which the cells are extended in the honeycomb formed body 100 to form a partial segment aggregate 120 in such a manner that a plurality of partial segments 3 are partitioned; and forming a buffer portion 5 between respective partial segments 3 adjacent to each other in the partial segment aggregate 120 to fill an entire space between the respective partial segments adjacent to each other, thereby obtaining a honeycomb structure 130.

3 Claims, 12 Drawing Sheets

MANUFACTURING METHOD OF HONEYCOMB STRUCTURE

BACKGROUND OF THE INVENTION

1. Field of the Invention

The present invention relates to a manufacturing method of a honeycomb structure. More particularly, it relates to a manufacturing method of a honeycomb structure that can improve a manufacturing efficiency and can also improve a raw material yield.

2. Description of the Related Art

In various fields of, e.g., chemistry, electric power, steel, and others, a honeycomb structure formed of ceramics superior in heat resistance and corrosion resistance is adopted as a carrier or a filter for a catalytic device that is used for, e.g., environmental measures or recovery of specific materials. In particular, the honeycomb structure is recently vigorously utilized as a diesel particulate filter (DPF) which has a plugged honeycomb structure obtained by alternately plugging cell opening portions on both end surfaces and traps a particulate matter (PM) discharged from, e.g., a diesel engine. Further, a silicon carbide (SiC), cordierite, or an aluminum titanate (AT) which is superior in heat resistance and chemical stability is preferably used as a material for the honeycomb structure utilized in a corrosive gas environment at a high temperature.

Since the silicon carbide has a relatively high thermal expansion coefficient, a defect may occur in a large honeycomb structure formed by using the silicon carbide as an aggregate due to, e.g., a thermal shock at the time of use. Further, a defect may also occur due to a thermal shock at the time of burning a trapped particulate material to be removed. Therefore, when manufacturing a honeycomb structure of a predetermined size or a larger size that is formed by using the silicon carbide as an aggregate, a plurality of small plugged honeycomb structure segments are usually manufactured, these segments are bonded to each other to form one large bonded body, and an outer periphery of this bonded body is subjected to rough processing and grinding, thereby obtaining a plugged honeycomb structure having a desired shape, e.g., a cylindrical shape (see, e.g., JP-A-2003-291054). It is to be noted that the segments are bonded to each other using a binder, and the binder is applied to predetermined side surfaces of the segments so that the plurality of segments are bonded to each other on the side surfaces thereof.

When manufacturing a honeycomb structure having a desired shape by using such a method, usually, a plurality of rectangular solid segments must be bonded to form one large rectangular solid bonded body, then an outer periphery of this body must be subjected to rough processing to obtain a substantially desired shape, and grinding must be performed to accurately provide a desired shape, thereby obtaining the honeycomb structure having a desired shape. Therefore, there is a problem that extra manufacturing steps, e.g., rough processing step or a grinding step of the outer periphery are required and a raw material yield is reduced because the outer periphery is subjected to rough processing and grinding.

SUMMARY OF THE INVENTION

In view of the above-explained problem, it is an object of the present invention to provide a manufacturing method of a honeycomb structure that can improve a manufacturing efficiency and can also improve a raw material yield.

To achieve this object, the present invention provides the following manufacturing method of a honeycomb structure.

[1] A manufacturing method of a honeycomb structure, comprising: subjecting a raw material to extrusion forming to form a honeycomb formed body having a partition wall that partitions a plurality of cells that serve as flow paths for a fluid and are extended from one end surface to the other end surface; forming a plurality of notches extended in a direction along which the cells are extended in the honeycomb formed body to form a partial segment aggregate in such a manner that a plurality of partial segments are partitioned; and forming a buffer portion between respective partial segments adjacent to each other in the partial segment aggregate to fill an entire space between the respective partial segments adjacent to each other, thereby obtaining a honeycomb structure.

[2] The manufacturing method of a honeycomb structure according to [1], wherein the plurality of notches extended in a direction along which the cells are extended are formed in the honeycomb formed body from the one end surface toward the other end surface to partition the plurality of partial segments, thereby forming the partial segment aggregate.

[3] The manufacturing method of a honeycomb structure according to [2], wherein notches reaching the other end surface are formed in the honeycomb formed body to form the partial segment aggregate.

[4] The manufacturing method of a honeycomb structure according to [2], wherein notches remaining without cutting or reaching the other end surface are formed in the honeycomb formed body to form the partial segment aggregate, and a buffer portion is formed between the respective partial segments in the partial segment aggregate, and the other end surface portion that is left without having the notches formed therein is cut off in such a manner a cutting plane becomes parallel to the one end surface, thus obtaining a honeycomb structure having the buffer portion formed in the notches reaching the other end surface from the one end surface.

[5] The manufacturing method of a honeycomb structure according to [2], wherein notches remaining without cutting or reaching the other end surface are formed in the honeycomb formed body to form the partial segment aggregate.

[6] The manufacturing method of a honeycomb structure according to any one of [1] to [5], wherein the outermost peripheral portion is left in the honeycomb formed body without being cut, and a plurality of notches extended in a direction along which the cells are extended are formed in the honeycomb formed body from the one end surface toward the other end surface to partition the plurality of partial segments, thereby forming the partial segment aggregate.

[7] The manufacturing method of a honeycomb structure according to [1], wherein a plurality of notches are formed in a central portion in a central axis direction of the honeycomb formed body to form the partial segment aggregate while leaving both end portions uncut, and a buffer portion is formed between respective partial segments in the partial segment aggregate, and both the end portions which are left without having the notches formed therein are cut off in such a manner that a cutting plane becomes parallel to the one end surface, thereby obtaining a honeycomb structure having the buffer portion formed in the notches reaching the other end surface from the one end surface.

[8] The manufacturing method of a honeycomb structure according to [1], wherein a plurality of notches are formed in a central portion in a central axis direction of the honeycomb formed body to form a partial segment aggregate while leaving both end portions uncut.

[9] A honeycomb structure obtained by the manufacturing method of a honeycomb structure according to any one of [1] to [8].

[10] The honeycomb structure according to [9], wherein a thermal expansion coefficient is equal to or above $1\times10^{-6}$/° C.

[11] The honeycomb structure according to [9] or [10], wherein opening portions of predetermined cells on one end surface and opening portions of remaining cells on the other end surface are plugged.

According to the manufacturing method of a honeycomb structure of the present invention, one honeycomb formed body is extruded to be formed into a desired shape, the notches are formed in this body to partition the partial segments, the buffer portion is formed between the respective partial segments to fill the entire notches (an entire space between the respective partial segments adjacent to each other), thereby forming the honeycomb structure. Therefore, rough processing for the outer periphery is not required, and hence a manufacturing efficiency can be improved, and a raw material yield can be also greatly improved.

DESCRIPTION OF REFERENCE NUMERALS

1, 11, 31, 41, and 51: one end surface, 2, 12, 32, 42, and 52: the other end surface, 3, 13, 33, 43, and 53: partial segment, 33*a*: partial segment constituting the outer periphery, 33*b*: partial segment placed at the central portion, 4, 14, 34, and 44: notch, 5, 15, 35, 45, and 55: buffer portion, 6: thick-walled portion, 16 and 56: cutting plane, 18 and 58: non-notched portion, 21: gripper, 22: portion corresponding to the partial segment, 23: a portion with which the gripper comes into contact, 36: honeycomb structure portion, 46: outermost peripheral portion, 51A: one end portion, 52A: the other end portion, 61: partition wall, 62: cell, 71: space, 72: central portion, 100 and 200: honeycomb formed body, 110 and 210: plugged honeycomb formed body, 120, 121, 122, 220, 420, and 520: partial segment aggregate, 130, 240, 300, 310, 320,

330, 340, 350, 360, 370, 430, 430A, 430B, 540, 610, and 620: honeycomb structure, 230 and 530: buffer portion arranged partial segment, and D: depth of the space.

DETAILED DESCRIPTION OF THE PREFERRED EMBODIMENTS

Although embodiments for carrying out the present invention will now be explained in detail with reference to the drawings, the present invention is not restricted to the following embodiments, and it should be understood that the design is appropriately changed or improved based on normal knowledge of persons skilled in the art without departing from the scope of the present invention.

Figure 1:
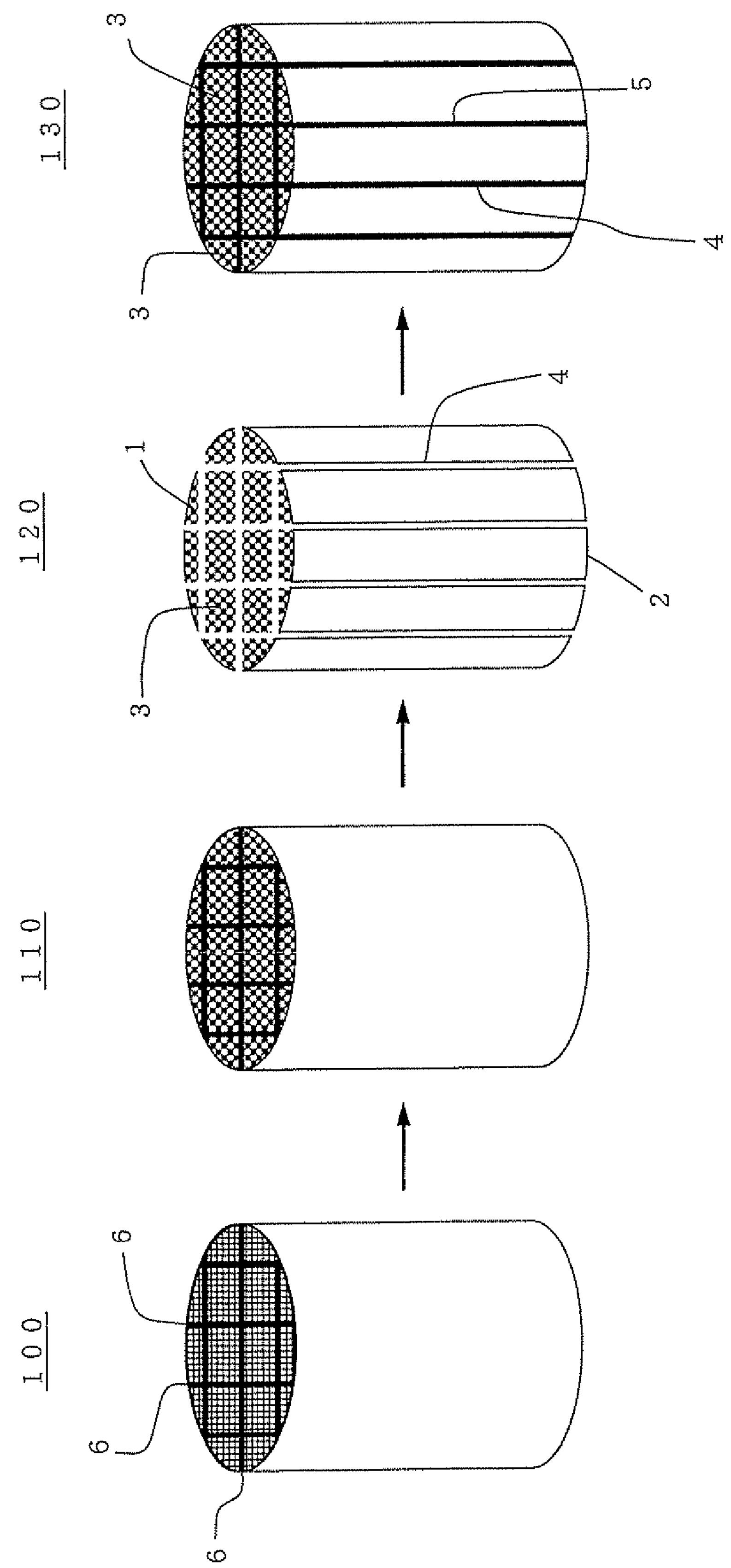
FIG. 1 is a perspective view schematically showing a process of forming a honeycomb structure in an embodiment of a manufacturing method of a honeycomb structure according to the present invention.

(1) Embodiment of Manufacturing Method of Honeycomb Structure:

According to an embodiment of a manufacturing method of a honeycomb structure of the present invention, as shown in FIG. 1, a raw material is extruded to form a honeycomb formed body 100 having a partition wall that partitions a plurality of cells that serve as flow paths for a fluid and are extended from one end surface 1 to the other end surface 2, a plurality of notches 4 extended in a direction along which the cells are extended are formed to form an aggregate 120 of a plurality of partial segments 3 to partition the partial segments 3 in the honeycomb formed body, and a buffer portion 5 is formed between the respective partial segments 3 adjacent to each other in the aggregate 120 of the partial segments, thereby obtaining a honeycomb structure 130 having the buffer portion formed in the notches reaching the other end surface 2 from the one end surface 1. Here, the "partial segment" means each segment partitioned by forming notches parallel to the central axis in one honeycomb formed body, and it includes a partial segment separated from the other partial segments, a partial segment that is connected with the other partial segments on the other end surface side due to presence of an non-notched portion remaining on the other end surface side even though notches are formed on the one end surface side, and a partial segment connected with the other partial segments at both end portions (both end surface sides) due to formation of a plurality of notches at a central portion in the central axis direction without cutting both the end portions. FIG. 1 is a perspective view schematically showing a process of forming a honeycomb structure in an embodiment of the manufacturing method of a honeycomb structure according to the present invention. Further, as shown in FIG. 1, in the manufacturing method of a honeycomb structure according to this embodiment, it is preferable to seal opening portions of predetermined cells on the one end surface 1 and opening portions of the remaining cells on the other end surface 2 in the honeycomb formed body 100 to form a plugged honeycomb formed body 110 and notch the plugged honeycomb formed body 110 to provide the aggregate of the partial segments. Furthermore, it is preferable for the obtained honeycomb structure 130 to be finally fired and to thereby become porous, but the honeycomb formed body 100 may be fired before forming the notches 4, or the honeycomb formed body 100 may be fired after forming the notches 4. Moreover, when firing the honeycomb formed body 100 before forming the notches 4, the plugged honeycomb formed body 110 may be fired, or plugging may be performed after firing the honeycomb formed body 100 and then the body may be again fired in order to fire a plugged portion.

When manufacturing a large cylindrical honeycomb structure by using a material having a high thermal expansion coefficient like a silicon carbide, rough processing using a device such as a bead saw and grinding (grinding processing) using a device such as a cam grinding machine must be usually performed with respect to an outer periphery after manufacturing rectangular solid segments and bonding these segments to fabricate a large rectangular solid bonded body in order to avoid a damage due to a thermal shock, thereby providing a cylindrical honeycomb structure. Therefore, since an extra manufacturing step, e.g., a rough processing step for an outer peripheral portion is required and the outer periphery is subjected to rough processing, a raw material yield is not high. On the other hand, according to the manufacturing method of a honeycomb structure of this embodiment, since a manufacturing step of bonding rectangular solid segments and a manufacturing step of performing rough processing with respect to an outer peripheral portion for fabrication of a cylindrical honeycomb formed body of a desired size are not provided, a manufacturing efficiency is high, and a raw material yield is also high. Here, the term "rough processing" means grinding an outer periphery of a bonded body having a shape, e.g., a rectangular solid to provide a shape close to a desired shape. Additionally, the term "grinding" means further grinding the outer periphery of the bonded body subjected to rough processing to be accurately finished with a desired shape and desired surface smoothness. Each manufacturing step will now be explained.

(1-1) Formation of Honeycomb Formed Body

First, a binder, a surface active agent, a pore forming material, water, and others are added to a ceramic raw material to provide a raw material. As the ceramic raw material, it is preferable to use at least one selected from a group including a silicon carbide, a silicon-silicon carbide base composite material, cordierite, mullite, an alumina, spinel, a silicon carbide-cordierite base composite material, a lithium aluminum silicate, an aluminum titanate, and an iron-chrome-aluminum base alloy. Among others, the silicon carbide or the silicon-silicon carbide base composite material is preferable. When using the silicon-silicon carbide base composite material, a mixture of a silicon carbide powder and a metal silicon powder is utilized as the ceramic raw material.

As the binder, there is, e.g., methyl cellulose, hydroxypropoxyl cellulose, hydroxyethyl cellulose, carboxymethyl cellulose, or polyvinyl alcohol. Among others, using both methyl cellulose and hydroxypropoxyl cellulose is preferable. It is preferable for a content of the binder to be one to 20 weight % with respect to the entire raw material.

It is preferable for a content of water to be 18 to 45 weight % with respect to the entire raw material.

As the surface active agent, it is possible to use ethylene glycol, dextrin, a fatty acid soap, or polyalcohol. Each of these materials may be solely used, or two or more in these materials may be combined to be used. It is preferable for a content of the surface active agent to be five weight % with respect to the entire raw material.

The pore forming material is not restricted in particular as long as air holes can be formed after firing, and there is, e.g., starch, a resin balloon, a hygroscopic resin, or a silica gel. It is preferable for a content of the pore forming material to be zero to 15 weight % with respect to the entire raw material.

Then, the raw material is kneaded to form kneaded clay. A method of kneading the raw material to form kneaded clay is not restricted in particular, and there is a method of using, e.g., a kneader or a vacuum clay kneader.

The kneaded clay is formed to form a honeycomb formed body. A method of molding the kneaded clay to form a honeycomb formed body is not restricted in particular, and it is possible to use a conventionally known molding method, e.g., extrusion forming or injection molding. For example, a method of using a die having a desired cell shape, partition wall thickness, and cell density and performing extrusion forming to form a honeycomb formed body can be taken as a preferred example. As a material of the die, a cemented carbide that is hard to be worn away is preferable. As a shape of the honeycomb formed body 200, a partition wall may have a uniform thickness, or a portion that is notched at a later step may be formed to be thick walled. For example, in the honeycomb formed body 100 depicted in FIG. 1, a thick-walled portion 6 having a larger wall thickness than the partition wall is provided at each of portions where notches are formed. In this case, it is preferable to form each notch by scraping away this thick-walled portion 6.

Drying the obtained formed body before firing is preferable. A method of drying is not restricted in particular, and there are an electromagnetic wave heating scheme, e.g., drying by microwave heating or drying by high-frequency dielectric heating and an external heating scheme, e.g., hot-air drying or superheated steam drying. Among others, it is preferable to evaporate a fixed amount of moisture by the electromagnetic wave heating scheme and then evaporate the remaining moisture by the external heating scheme since the entire formed body can be rapidly and uniformly dried without generating a crack. As drying conditions, it is preferable to remove moisture of 30 to 90 weight % with respect to a moisture amount before drying by the electromagnetic wave heating scheme and reduce the same to three weight % or below by the external heating scheme. Drying by dielectric heating is preferable as the electromagnetic wave heating scheme, and hot-air drying is preferable as the external heating scheme.

Subsequently, when a length of the honeycomb formed body in the central axis direction is not a desired length, it is preferable to cut both end surfaces (both end portions) to provide a desired length. Although a cutting method is not restricted in particular, there is a method using a circular saw cutting machine.

Then, it is preferable to seal the opening portions of predetermined cells on one end surface of the honeycomb formed body and the opening portions of the remaining cells on the other end surface to form the plugged honeycomb formed body 110. When the plugged honeycomb formed body is formed, the obtained honeycomb structure is the plugged honeycomb structure. Although a plugging method is not restricted in particular, for example, there is the following method. A sheet is attached to one end surface of the honeycomb formed body, and then holes are formed at positions on the sheet corresponding to cells that are to be plugged. Further, the end surface of the honeycomb formed body having the sheet attached thereto is immersed in a plugging slurry obtained by slurring a constituent material for plugging, and opening end portions of the cells to be plugged are filled with the plugging slurry through the holes formed in the sheet. Furthermore, cells on the other end surface of the honeycomb formed body which are not plugged on the one end surface are plugged by the same method as the method of plugging the one end surface (filling with the plugging slurry). As a constituent material for plugging, it is preferable to use the same material as that for the honeycomb formed body.

Then, it is preferable to fire the honeycomb formed body 100 (the plugged honeycomb formed body 110). Before firing, it is preferable to perform calcination in order to remove, e.g., the binder. It is preferable to perform calcination in an air atmosphere at 400 to 500° C. for 0.5 to 20 hours. Although a method of performing calcination and firing is not restricted in particular, and firing can be carried out by using, e.g., an electric furnace or a gas furnace. As firing conditions, it is preferable to perform heating in an inert atmosphere of, e.g., nitrogen or argon at 1300 to 1500° C. for one to 20 hours. It is to be noted that firing may be carried out after forming the aggregate 120 of the partial segments.

Figure 4A:
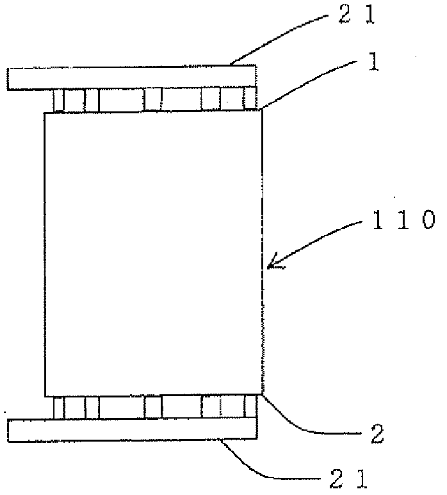
FIG. 4A is a side view schematically showing a state where both end surfaces of a honeycomb formed body (a plugged honeycomb formed bodies) are grasped by a gripper.
Figure 4B:
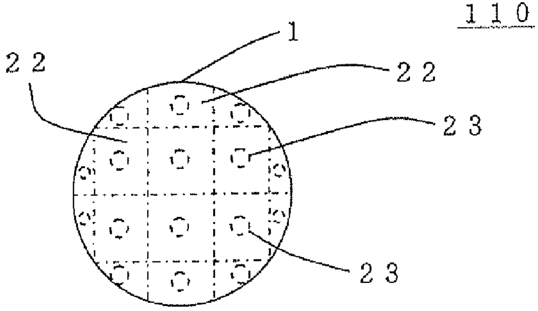
FIG. 4B is a plan view schematically showing a part of the plugged honeycomb formed body on one end surface coming into contact with the gripper from the one end surface side.

(1-2) Fabrication of Partial Segment Aggregate;

According to the manufacturing method of the honeycomb structure of this embodiment, the plurality of notches 4 extended along (in parallel to the central axis) a direction that the cells are extended from the one end surface 1 toward the other end surface 2 side are formed in the honeycomb formed body 100 (the plugged honeycomb formed body 110) to partition the plurality of partial segments, thereby obtaining such an aggregate 120 of the partial segments as shown in FIG. 1. Here, "the plurality of notches 4 extended along (in parallel to the central axis) a direction that the cells are extended from the one end surface 1 toward the other end surface 2 side" implies a state where the notches 4 are formed, i.e., arrangement of the notches 4 in the honeycomb formed body 100, and means that the notches 4 extended along (in the central axis direction) the direction that the cells are extended are formed on at least the one end surface 1 side (the one end surface 1 are cut). Therefore, it does not mean that a notch forming device is brought into contact with the one end surface 1 side and cutting is performed toward the other end surface 2 as an operation of forming the notches 4. Therefore, in the operation of forming the notches 4, cutting may be started from the one end surface 1 side, it may be started from a side surface, or it may be started from other directions. Furthermore, although the notches 4 are formed along the direction that the cells are extended, the notches 4 are formed to be extended in parallel to the central axis when the cells are formed to be extended in parallel to the central axis of the honeycomb structure (the honeycomb formed body) like the manufacturing method of a honeycomb structure according to this embodiment. Moreover, when the cells are not parallel to the central axis of the honeycomb structure, the notches 4 are formed in the direction that the cells are extended irrespective of the central axis of the honeycomb structure. In this specification, although the honeycomb structure in which the cells are formed to be extended in parallel to the central axis will be explained, the present invention is not restricted to such a conformation. In the manufacturing method for a honeycomb structure according to this embodiment, the notches 4 reaching the other end surface 2 from the one end surface 1 are formed in the honeycomb formed body 100 (the plugged honeycomb formed body 110) to form the aggregate of the partial segments, and the respective partial segments are separated from each other. In this case, the respective partial segments may be independent from each other, but it is preferable to grasp both the end surfaces 1 and 2 of the plugged honeycomb formed body 110 by a gripper 21 that grasps portions 22 corresponding to the respective partial segments on both the end surfaces 1 and 2 of the plugged honeycomb formed body 110 and form the notches reaching the other end surface 2 in the plugged honeycomb formed body 110 to form the aggregate of the partial segments. As a result, since the respective partial segments are fixed by the gripper 21 even after the notches 4 reaching from the one end surface 1 to the other end surface 2 are formed in the plugged honeycomb formed body, the partial segments are not parted, and the buffer portion can be readily formed at the next step in this state, thereby improving a production efficiency. FIG. 4A is a side view schematically showing a state where both the end surfaces 1 and 2 of the plugged honeycomb formed body 110 are grasped by the gripper 21. FIG. 4B is a plan view schematically showing portions 23 on the one end surface 1 with which the gripper 21 comes into contact in the plugged honeycomb formed body 110 from the other end surface 1 side.

In such a end surface 1 as formed in the aggregate 120 of the partial segments depicted in FIG. 1, when forming the notches 4 that are linear and have both end portions (both distal end portions of the notches 4 on the one end surface 1) reaching the outermost peripheral portion, it is preferable to use a notch forming device such as a discoid multi-grinding stone, a multi-blade saw, or a multi-wire saw. The discoid multi-grinding stone aligns a plurality of discoid grinding stones on the side of the outer peripheral portion of the honeycomb formed body 100 (the plugged honeycomb formed body 110) to be parallel to each other and notches the honeycomb fired article by rotating and moving the respective grinding stones in parallel to the one end surface 1 of the honeycomb formed body 100 (the plugged honeycomb formed body 110), and a machine having an article name "high-speed flat-surface grinding machine" manufactured by ELB can be used, for example. Additionally, the multi-blade saw aligns a plurality of bar-like (or tabular) grinding stones on the one end surface 1 to be parallel to each other and notches the honeycomb formed body 110 (the plugged honeycomb formed body 110) from the one end surface 1 toward the other end surface 2 by reciprocating the respective grinding stones in parallel to the one end surface 1, and a machine having an article name "blade saw" manufactured by Nomura Machine Tool Works Ltd. can be used, for example. Further, the multi-wire saw aligns a plurality of wire-like grinding stones on the one end surface 1 to be parallel to each other and notches the honeycomb formed body 100 (the plugged honeycomb formed body 110) from the one end surface 1 toward the other end surface 2 by reciprocating the respective grinding stones in parallel to the one end surface 1 or by continuously moving the respective grinding stones in one direction, and a machine having an article name "multi-wire saw" manufactured by Takatori Corporation can be used. Furthermore, partition walls may be or may not be present on notch surfaces of the notches 4 to a certain degree.

In regard to a size of the partial segment 3, it is preferable for an area of a cross section perpendicular to the central axis direction to be three to 16 $cm^2$, and more preferable for the same to be seven to 13 $cm^2$. A pressure loss when a gas circulates in the honeycomb structure may become large when this area is smaller than three $cm^2$, and a damage prevention effect of the partial segment 3 may be reduced when the area is larger than 16 $cm^2$.

Figure 15A:
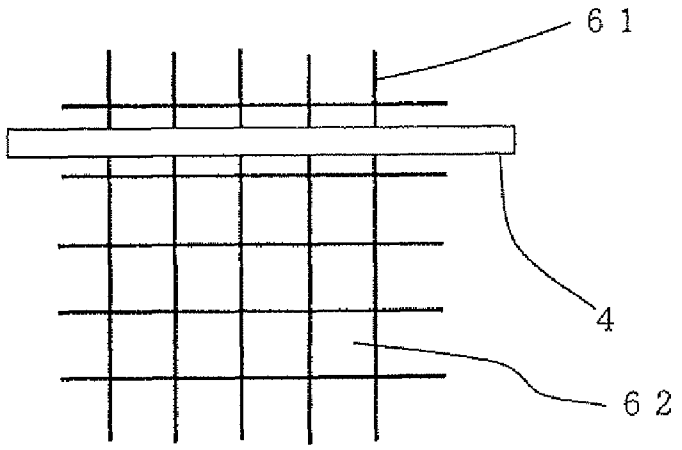
FIG. 15A is a partially enlarged plan view of one end surface of a honeycomb formed body schematically showing how to cut a partition wall when notching the honeycomb formed body in an embodiment of the manufacturing method of a honeycomb structure according to the present invention.
Figure 15B:
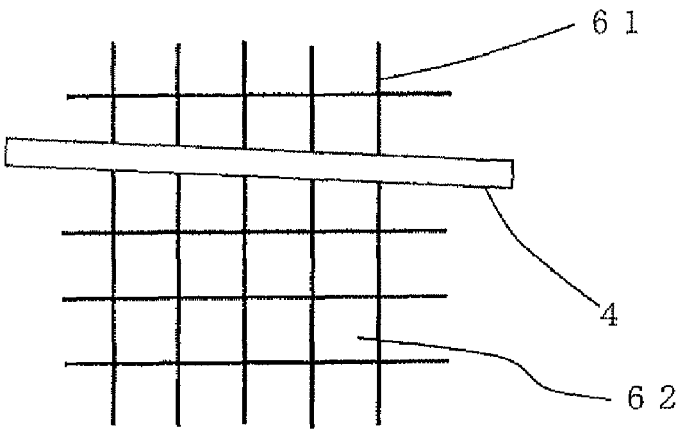
FIG. 15B is a partially enlarged plan view of one end surface of a honeycomb formed body schematically showing how to cut a partition wall when notching the honeycomb formed body in an embodiment of the manufacturing method of a honeycomb structure according to the present invention.
Figure 15C:
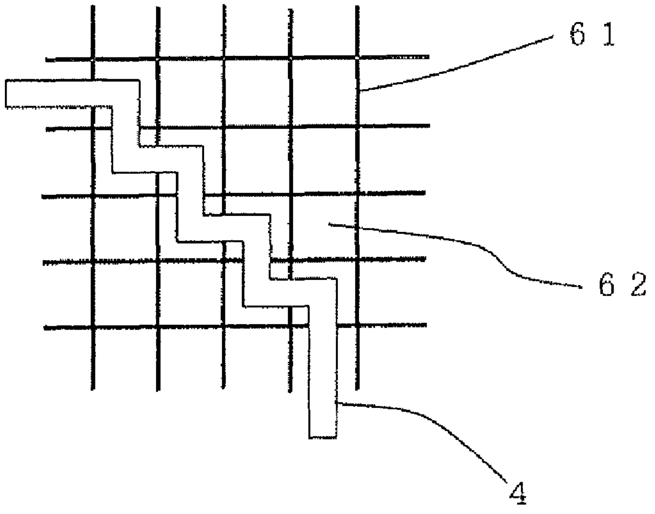
FIG. 15C is a partially enlarged plan view of one end surface of a honeycomb formed body schematically showing how to cut a partition wall when notching the honeycomb formed body in an embodiment of the manufacturing method of a honeycomb structure according to the present invention.
Figure 16A:
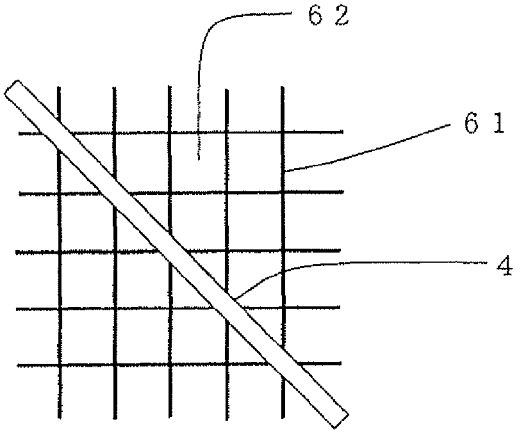
FIG. 16A is a partially enlarged plan view of one end surface of a honeycomb formed body schematically showing how to cut a partition wall when notching the honeycomb formed body in an embodiment of the manufacturing method of a honeycomb structure according to the present invention.
Figure 16B:
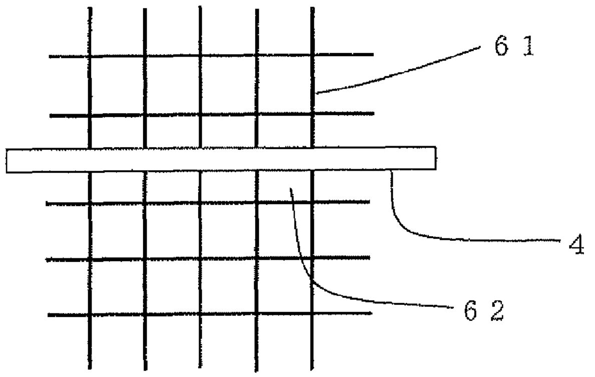
FIG. 16B is a partially enlarged plan view of one end surface of a honeycomb formed body schematically showing how to cut a partition wall when notching the honeycomb formed body in an embodiment of the manufacturing method of a honeycomb structure according to the present invention.

In the manufacturing method of a honeycomb structure according to this embodiment, as shown in FIG. 1, the notch 4 is formed in the thick-walled portion 6 of the honeycomb formed body 100 (the plugged honeycomb formed body 110). It is preferable to form the thick-walled portion in the honeycomb formed body and notch this thick-walled portion in this manner, but it is also preferable to form a notch to cut the partition wall without forming the thick-walled portion. For example, as shown in FIG. 15A, a notch 4 may be formed to cut a partition wall 61 forming cells 62 in one column along the cells 62 in one column. Moreover, as shown in FIG. 15B, a notch 4 may be formed to cut a partition wall 61 forming cells 62 in two columns along the cells 62 in the two columns. Additionally, as shown in FIG. 15C, a notch 4 may be formed to cut a partition wall 61 forming cells 62 in a zigzag pattern. As shown in FIG. 16A, a notch 4 may be formed to cut a partition wall 61 forming cells in one column formed with a large width along the cells 62 in the one column. Each of FIGS. 15A to 15C and FIGS. 16A and 16B is a partially enlarged plane view of one end surface of a honeycomb formed body schematically shows how to cut the partition wall 61 when notching the honeycomb formed body in an embodiment of the manufacturing method of a honeycomb structure according to the present invention. It is to be noted that each of FIGS. 15A to 15C and FIGS. 16A and 16B shows the non-plugged honeycomb formed body, but adopting the same partition wall cutting method when forming no notch in the plugged honeycomb structure subjected to plugging is preferable.

(1-3) Manufacturing of Honeycomb Structure;

The buffer portion 5 is formed between the respective partial segments adjacent to each other in the aggregate 120 of the partial segments to fill (satisfy) the entire space between the respective partial segments adjacent to each other, thereby obtaining the honeycomb structure 130. The buffer portion 5 is arranged on the entire opposed bonded surfaces of the partial segments adjacent to each other. Here "the buffer portion 5 is formed to fill the entire space (the entire notches) between the respective partial segments adjacent to each other" means that the buffer portion satisfies the entire space (the entire notches) between the respective partial segments adjacent to each other, and corresponds to a state where a spatial region is not present between the respective partial segments adjacent to each other. Further, the phrase "the special region is not present" means that fine air bubbles or the like may be present but a large space (the spatial region) is not present, and the large space means a space whose maximum length in a cross section perpendicular to a thickness direction of each notch exceeds 5 mm. The "maximum length" means a length along a direction that the space becomes longest in this cross section. For example, the maximum length is a length of a diagonal in case of a rectangular, and it is a length of a major axis in case of an ellipse. In other words, according to the manufacturing method of a honeycomb structure of this embodiment, the buffer portion 5 fills the entire notches to prevent a space whose maximum length in a cross section perpendicular to the thickness direction of the notches exceeds 5 mm from being present in the space formed by the notches. The buffer portion 5 plays a role of buffering (absorbing) a variation in volume when each partial segment is thermally expanded or thermally contracted, and also plays a role of bonding the respective partial segments to each other. Therefore, "the buffer portion 5 is formed between the respective partial segments adjacent to each other" also means that "the respective partial segments adjacent to each other are bonded to each other through the buffer portion 5". Further, it can be also said that "the buffer portion is formed by filing a gap between the respective partial segments adjacent to each other, i.e., a space (each notch) with a filler" when the buffer portion 5 is formed by filing a space between the respective partial segments adjacent to each other with the filler. As a method of forming the buffer portion 5, there is a method of filling each notch with a slurry-like material obtained by dispersing the filler in a dispersion medium, e.g., water since each notch portion is maintained with a fixed thickness by the gripper 21 even after each notch is formed in a case where the honeycomb formed body 100 is grasped by the gripper 21 as shown in FIG. 4A. At this time, a thickness of the notch portion held by the gripper 21 is a thickness of the buffer portion 5. When filling each notch with the slurry, it is preferable to put the partial segment aggregate 120 fixed by the gripper into an airtight container and put, e.g., a tape on the outer periphery to avoid leak of the slurry from the outer periphery. When the partial segment aggregate 120 is large in size, putting the slurry from a plurality of positions enables filling without applying a high pressure. As a material of the tape put on the outer periphery of the partial segment aggregate 120, there is a non-permeable material, e.g., polyester. In this case, when trying putting the slurry in a state where the partial segment aggregate 120 is stationary, the dispersion medium is absorbed into the partition wall and the slurry does not uniformly spread in the notches 4 in some cases if the partial segment aggregate 120 is porous, and a state where the buffer portion fills the entire notches is hard to be obtained. Therefore, in such a case, it is preferable to put the slurry by applying a pressure while vibrating the partial segment aggregate 120 by a vibrating device. As the vibrating device, for example, a machine having an article name "small vibration-testing machine" manufactured by Asahi Factory Corporation can be used. Furthermore, to facilitate uniform infiltration of the slurry into the notches (to facilitate filling the entire notches with the buffer portion), it is preferable to perform water repellent processing with respect to an inner wall of each notch (an outer peripheral wall of each partial segment). As the water repellent processing, there is, e.g., a method of spraying the slurry containing SiC particles. After the slurry is put into the notches by applying a pressure, it is preferable to perform drying at 100° C. or above.

Furthermore, as a method of forming the buffer portion 5 when using the gripper 21, there is a method of forming the filler into a tape-like shape, filling the notches with the plurality of tape-like fillers, and then performing a heat treatment to obtain the buffer portion 5. The method of forming the filler into a tape-like shape is not restricted in particular, there is a method of mixing, e.g., the filler, a binder, a surface active agent, water, and others to provide a raw material and forming the material into a take-like shape based on a tape forming method. Further, as the method of forming the buffer portion 5, there is a method of filling the notches with a powder filler and then performing plugging upper and lower portions with, e.g., a cement or an adhesive. The notches can be filled with the powder filler by tapping.

Further, as the method of forming the buffer portion when the gripper 21 is not used, there is a method of applying a slurry-like material obtained by dispersing a filler in a dispersion medium such as water to bonded surfaces of the respective partial segments, putting the tape-like filler to the bonded surfaces, and then bonding the respective segments with each other.

As the filler, there is, e.g., an inorganic fiber, a colloidal silica, clay, SiC particles, an organic binder, a resin balloon, or a slurry obtained by adding water to a dispersing agent to be kneaded. When molding the filler into a tape-like shape to be put into the notches, it is preferable to use a material that foams by a heat treatment as the filler and heat the partial segment aggregate after filling the notches with the filler. As the material that foams by a heat treatment, there is, e.g., an urethane resin.

(1-4) Outer Periphery Coating Processing;

It is preferable to perform outer periphery coating processing after forming the honeycomb structure. When the outer periphery coating processing is performed, there can be obtained an advantage of an improvement in accuracy for irregularities on a honeycomb outer peripheral portion. As the outer periphery coating processing, there is a method of applying an outer periphery coating material to the outer periphery of the honeycomb structure and then drying this structure. As the outer periphery coating material, it is possible to use a material obtained by mixing, e.g., an inorganic fiber, a colloidal silica, clay, SiC particles, an organic binder, a resin balloon, a dispersing agent, or water. Further, the method of applying the outer periphery coating material is not restricted in particular, and there is, e.g., a method of coating the honeycomb structure by using a rubber spatula or the like while rotating the honeycomb structure on a wheel.

(2) Honeycomb Structure:

One embodiment of a honeycomb structure according to the present invention obtained by the manufacturing method of a honeycomb structure according to this embodiment has the partition wall that partitions the plurality of cells that serve as flow paths for a fluid and are extended from the one end surface to the other end surface, and includes the honeycomb structure portion in which the plurality of partial segments partitioned by the plurality of notches extended from the one end surface in the central axis direction, the honeycomb structure portion serving as the partial segments, and the buffer portion 5 that is arranged between the partial segments adjacent to each other to fill (satisfy) the entire space between the partial segments adjacent to each other. Furthermore, the outer periphery coat may be formed to cover the outer periphery of the entire partition wall. Moreover, it is also preferable to provide the honeycomb structure (the plugged honeycomb structure) in which the opening portions of the predetermined cells on the one end surface and the opening portions of the remaining cells on the other end surface are plugged.

It is preferable for the entire honeycomb structure portion constituting the honeycomb structure according to this embodiment to have a shape of the finally obtained honeycomb structure. For example, a desired shape such as a cylindrical shape or an oval shape can be obtained. Additionally, in regard to a size of the honeycomb structure portion, in case of the cylindrical shape, it is preferable for a bottom surface to have a diameter of 50 to 450 mm and more preferable for the same to have a diameter of 100 to 350 mm. As a length of the honeycomb structure portion 4 in the central axis direction, a value of 50 to 450 mm is preferable, and a value of 100 to 350 mm is more preferable. As a material of the honeycomb structure portion, ceramic is preferable, and at least one selected from a group including a silicon carbide, a silicon-silicon carbide base composite material, cordierite, mullite, an alumina, spinel, a silicon carbide-cordierite base composite material, a lithium aluminum silicate, and an aluminum titanate, and an iron-chrome-aluminum base alloy is more preferable since they are superior in strength and heat resistance. Among others, the silicon carbide or the silicon-silicon carbide base composite material is particularly preferable. Since a thermal expansion coefficient of the silicon carbide is relatively high, a defect may occur in the honeycomb structure formed by using the silicon carbide as an aggregate due to a thermal shock at the time of use when forming the honeycomb structure of a large size. However, when the plurality of partial segments are formed by notching at a plurality of positions and the buffer portion is arranged like the honeycomb structure according to the present invention, thermal expansion of the silicon carbide is buffered the buffer portion, thereby demonstrating an effect of prevention of occurrence of a defect in the honeycomb structure.

It is preferable for the honeycomb structure to be porous. A porosity of the honeycomb structure portion is 30 to 80%, and a porosity of 40 to 65% is preferable. When the porosity is set to fall within such a range, an advantage of reducing a pressure loss while maintaining strength can be obtained. When the porosity is less than 30%, a pressure loss is increased, which is not preferable. When the porosity exceeds 80%, strength is reduced and a thermal conductivity is lowered, which is not preferable. The porosity is a value measured based on the Archimedes method.

As an average pore diameter in the honeycomb structure portion 4, a value of five to 50 μm is preferable, and a value of seven to 35 μm is more preferable. When setting the average pore diameter to fall within such a range, an advantage of effectively catching a particulate matter (PM) can be obtained. When the average pore diameter is less than five μm, clogging is apt to occur due to the particulate matter (PM), which is not preferable. When the average pore diameter exceeds 50 μm, the particulate matter (PM) may pass through a filter without being trapped, which is not preferable. The average pore diameter is a value obtained by measuring a mercury porosimeter.

When the material of the honeycomb structure portion 4 is the silicon carbide, it is preferable for silicon carbide particles to have an average particle diameter of five to 100 μm. When such an average particle diameter is adopted, there can be obtained an advantage that control can be facilitated to realize a porosity or a pore diameter suitable for the filter. A pore diameter becomes too small when the average particle diameter is smaller than five μm, and a porosity becomes too small when the average particle diameter exceeds 100 μm. There is a problem that clogging is apt to occur due to the particulate matter (PM) when the pore diameter is too small, and a pressure loss is increased when the porosity is too small. The average particle diameter of a raw material is a value measured based on JIS R 1629.

A cell shape in the honeycomb structure portion (a cell shape in a cross section vertical to the central axis direction (the direction along which the cells are extended) of the honeycomb structure portion) is not restricted in particular, and there is, e.g., a triangular shape, a square shape, a hexagonal shape, an octagonal shape, a circular shape, or a combination of these shapes. As a thickness of the partition wall in the honeycomb structure portion, a value of 50 to 2000 μm is preferable. Strength of the honeycomb structure may be reduced when the thickness of the partition wall is smaller than 50 μm, and a pressure loss may be increased when the same is larger than 2000 μm. Although a cell density in the honeycomb structure portion is not restricted in particular, a value of 0.9 to 311 cells/cm$^2$ is preferable, and a value of 7.8 to 62 cells/cm$^2$ is more preferable.

It is preferable for the buffer portion constituting the honeycomb structure according to this embodiment to be arranged to fill the entire space of the notches in the honeycomb structure portion.

Further, as a thermal expansion coefficient of the obtained honeycomb structure, a value equal to or above $1\times10^{-6}$/° C. is preferable, and a value of $2\times10^{-6}$ to $7\times10^{-6}$/° C. is more preferable. According to the manufacturing method of a honeycomb structure of the present invention, even the honeycomb structure having such a high thermal expansion coefficient can be a honeycomb structure having high thermal shock resistance.

(3) Another Embodiment of Manufacturing Method of Honeycomb Structure

Figure 2:
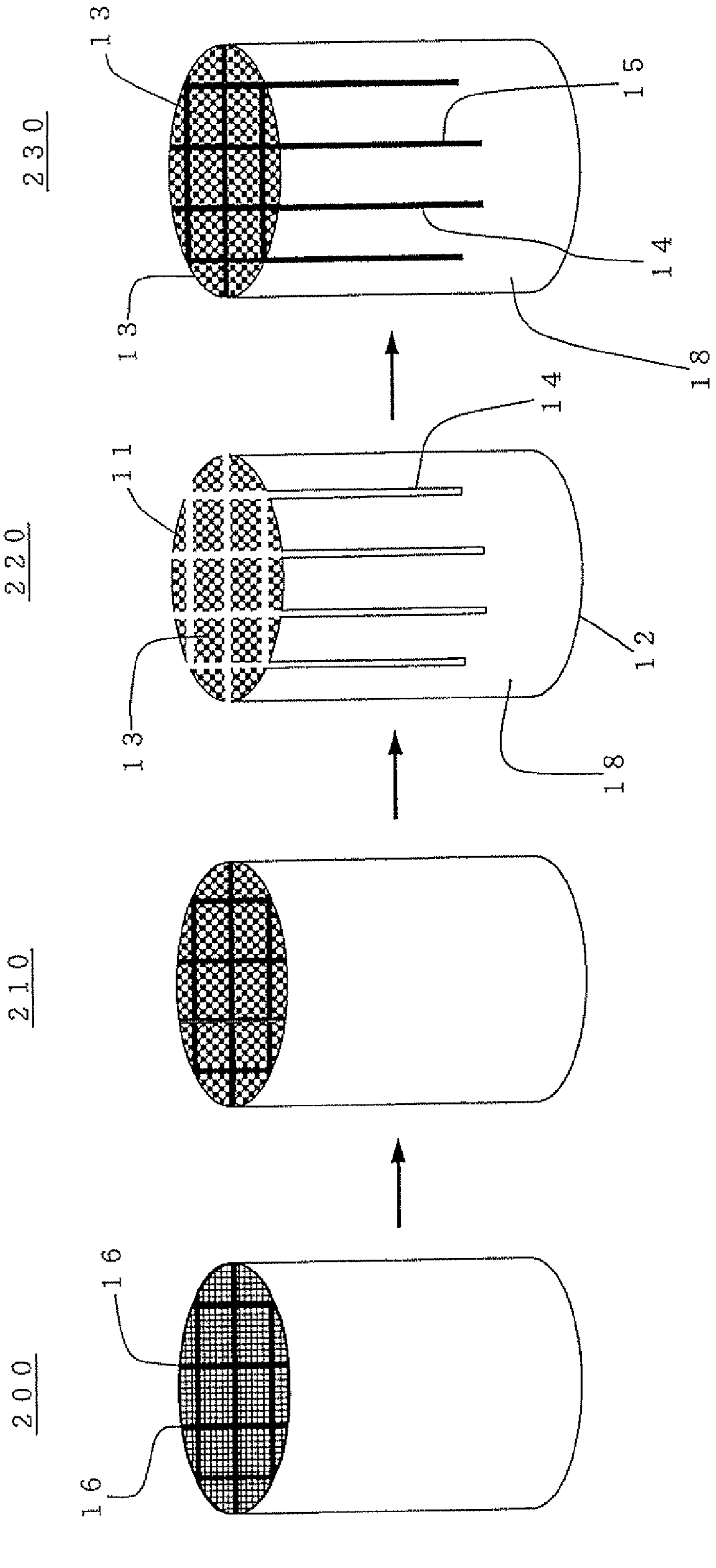
FIG. 2 is a perspective view schematically showing a process of forming a honeycomb structure halfway in another embodiment of the manufacturing method of a honeycomb structure according to the present invention.
Figure 3:
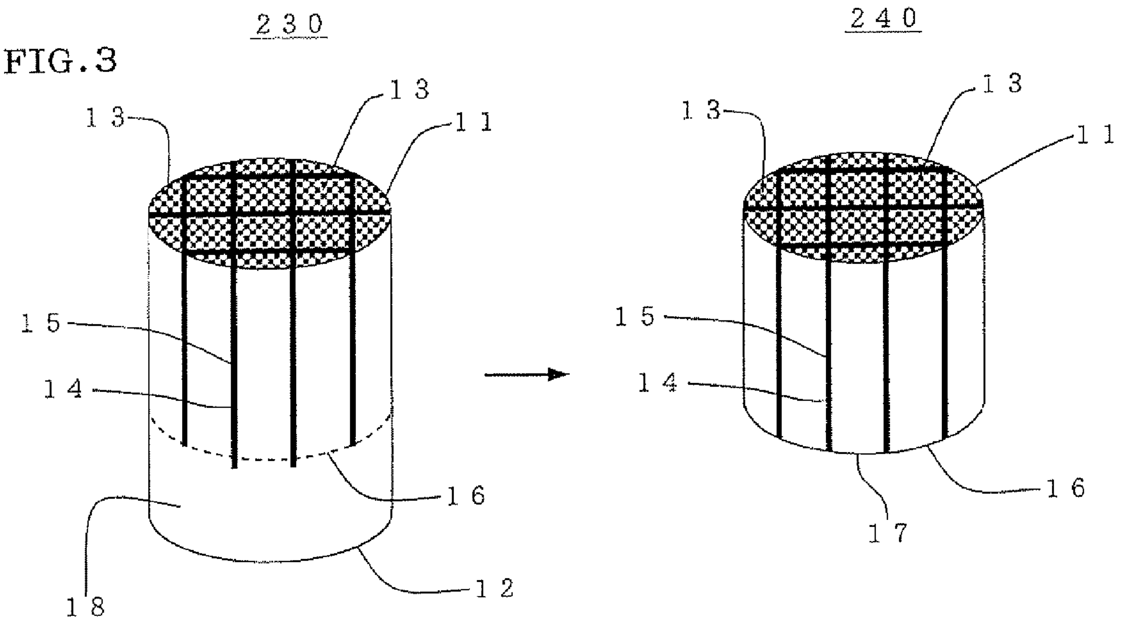
FIG. 3 is a perspective view schematically showing a process of forming a honeycomb structure by cutting off one remaining end portion side having no notch formed therein in another embodiment of the manufacturing method of a honeycomb structure according to the present invention.

As shown in FIG. 2, according to another embodiment of the manufacturing method of a honeycomb structure of the present invention, a honeycomb formed body 200 is manufactured, and a plugged honeycomb formed body 210 is manufactured as required like the above-explained embodiment of the manufacturing method of a honeycomb structure according to the invention. Then, notches 14 that are extended from one end surface 11 in parallel to a central axis (along a direction that cells are extended) and have the other end surface 12 side being left uncut are formed in the honeycomb formed body 200 (the plugged honeycomb formed body 210), thereby forming a partial segment aggregate 220. It is preferable to perform firing before or after manufacturing the partial segment aggregate 220. Then, a buffer portion 15 is formed between respective partial segments in the partial segment aggregate 220 to fabricate a buffer portion arranged partial segment 230. Subsequently, as shown in FIG. 3, the remaining other end surface 12 side (a non-notched portion) 18 having no notch 14 in the buffer portion arranged partial segment 230 is cut off in such a manner that a cutting plane 16 becomes parallel to the one end surface 11, thereby obtaining a honeycomb structure in which the buffer portion 15 is formed in the notches 14 reaching the other end surface 17 from the one end surface 11. FIG. 2 is a perspective view schematically showing a process of forming the honeycomb structure halfway in another embodiment of the manufacturing method of a honeycomb structure according to the present invention. FIG. 3 is a perspective view schematically showing a process of forming the honeycomb structure by cutting off the other remaining end portion side having no notch formed therein in another embodiment of the manufacturing method of a honeycomb structure according to the present invention.

According to this method, since the partial segments in the partial segment aggregate 220 are connected with each other on the other end surface 12 side, the respective partial segments do not have to be fixed by, e.g., a gripper as different from the example where the partial segments are separated from each other. Therefore, an operation of forming the notches and an operation of forming the buffer portion can be facilitated, thereby further improving a production efficiency.

(3-1) Fabrication of Partial Segment Aggregate;

According to a fabrication method of the partial segment aggregate 220 in the manufacturing method of a honeycomb structure in this embodiment, the notches 14 which are extended from the one end surface 11 to the other end surface 12 side in parallel with the central axis and remain without cutting the other end surface 12 side are formed in the honeycomb formed body 200 (the plugged honeycomb formed body 21) to thereby form the partial segment aggregate 220 in the fabrication method of the partial segment aggregate in the above-explained embodiment of the manufacturing method of a honeycomb structure according to the present invention. It is preferable for a length (a notch depth) of each notch 14 in the central axis direction (a piercing direction of the cells) to be 50 to 98% of the length of the honeycomb formed body 100 in the central axis direction. When this length is shorter than 50%, the other end surface side (the non-notched portion) 18 that is cut off at a later step and remains without forming the notches 14 becomes large, and a raw material yield is reduced in some cases. When this length is higher than 98%, the non-notched portion 18 is apt to be cracked in some cases.

As a thickness (a width) of the notch 14, a value of 0.3 to 3.0 mm is preferable, and a value of 1.0 to 1.5 mm is more preferable. A buffering effect between the partial segments 3 and 3 may be reduced in some cases when the thickness is smaller than 0.3 mm, and a pressure loss when circulating a gas in the honeycomb structure may be increased when the thickness is larger than 3.0 mm.

(3-2) Fabrication of Buffer Portion Arranged Partial Segment

As a method of forming the buffer portion 15 in the partial segment aggregate 220 to form the buffer portion arranged partial segment 230, it is preferable to adopt the same method as that used when fixing the partial segments by the gripper to form the buffer portion in the partial segment aggregate in the fabrication process of the honeycomb structure in the above-explained embodiment of the manufacturing method of a honeycomb structure according to the present invention. Further, as a filler used in formation of the buffer portion, it is preferable to utilize the same filler that is used in the fabrication process of the honeycomb structure in the above-explained embodiment of the manufacturing method of a honeycomb structure according to the present invention.

(3-3) Manufacturing of Honeycomb Structure;

Then, as shown in FIG. 3, the other end surface side (the non-notched portion) 18 remaining without forming the notches 14 in the buffer portion arranged partial segment 230 is cut off in such a manner that a cutting plane 16 becomes parallel to the one end surface 11, thereby obtaining a honeycomb structure 240 in which the buffer portion 15 is formed in the notches 14 reaching from the one end surface 11 to the other end surface 12. It is preferable that a position of the cutting plane 16 is a position at which all of the buffer portion 15 is cut and a length of the obtained honeycomb structure 240 in the central axis direction is a position where a desired length can be obtained. Moreover, it is preferable to use, e.g., a discoid multi-grinding stone, a multi-blade saw, or a multi-wire saw for the cutting operation.

Respective characteristics of the honeycomb structure obtained by the manufacturing method of a honeycomb structure according to this embodiment are preferably the same as those in an embodiment of a honeycomb structure according to the present invention obtained by the above-explained embodiment of the manufacturing method of a honeycomb structure according to the present invention.

Figure 5:
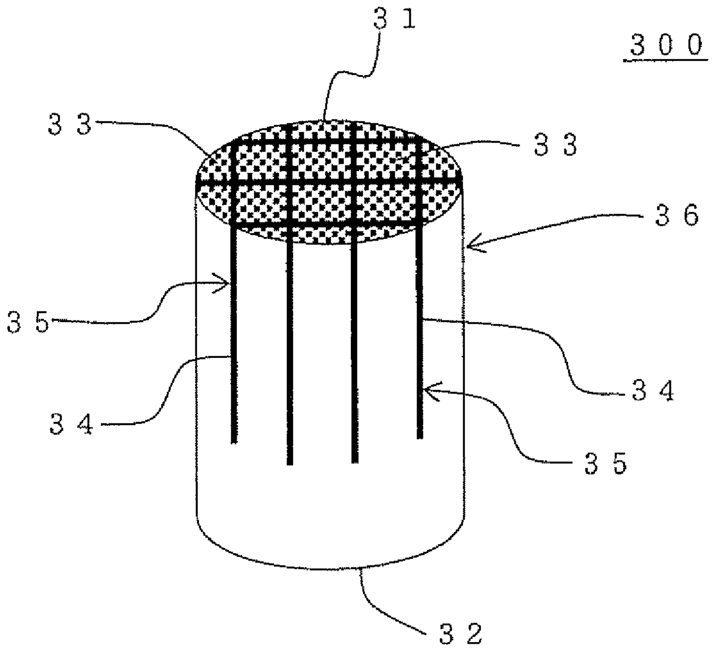
FIG. 5 is a perspective view schematically showing a honeycomb structure manufactured based on still another embodiment of the manufacturing method of a honeycomb structure according to the present invention.

(4) Still Another Embodiment of Manufacturing Method of Honeycomb Structure:

According to still another embodiment of the manufacturing method of a honeycomb structure of the present invention, a buffer portion arranged partial segment 230 (see FIG. 2) is manufactured in another embodiment of the manufacturing method of a honeycomb structure according to the present invention explained above, and the buffer portion arranged partial segment 230 is determined as a honeycomb structure which is a final product. Therefore, as shown in FIG. 5, a honeycomb structure 300 obtained by the manufacturing method of a honeycomb structure according to this embodiment has the same structure as the buffer portion arranged partial segment 230 (see FIG. 2), and has a partition wall that partitions a plurality of cells that serve as flow paths for a fluid and are extended from one end surface 31 to the other end surface 32, and includes a honeycomb structure portion 36 in which a plurality of partial segments 33 are partitioned by a plurality of notches 34 that are extended from the one end surface 31 along the central axis direction and do not reach the other end surface 32, and a buffer portion 35 arranged in the entire notches 34. Such a honeycomb structure 300 can be can be also preferably used as, e.g., a catalyst carrier or a filter. FIG. 5 is a perspective view schematically showing the honeycomb structure manufactured based on still another embodiment of the manufacturing method of a honeycomb structure according to the present invention.

In the honeycomb structure 300, since the plurality of partial segments 33 are partitioned, each partial segment 33 can be reduced in size, and a damage to each partial segment 33 due to a thermal shock can be avoided. Furthermore, since the partial segments 33 are formed through the buffer portion 35, thermal expansion of the partial segments 33 can be buffered by the buffer portion 35, thereby avoiding a damage to the partial segments 33.

It is preferable for a length (a notch depth) of each notch 34 in the central axis direction of the honeycomb structure portion 36 to be equal to or above 25% of the length of the honeycomb structure portion 36 in the central axis direction, more preferable for the same to be 25 to 99%, and particularly preferable for the same to be 25 to 75%. When catching a particulate matter in the honeycomb structure and then burning the particulate matter to be removed, a region where the highest temperature is realized is present in the range from the end surface on a gas outflow side to a length corresponding to 25% of the length of the honeycomb structure in the central axis direction (a position corresponding to 25% is not included). Therefore, when a gas flows in from the other end surface 32 of the honeycomb structure 300 according to this embodiment and flows out from the one end surface 31 of the same, since each notch 34 is formed with a length that is at least 25% of the length of the honeycomb structure portion 36 from the one end surface 31 in the central axis direction, the partial segments 33 are present in the region that has the highest temperature and undergoes a thermal shock, thereby effectively avoiding a damage to the honeycomb structure 300. Further, when each notch 34 is formed along the entire central axis direction (from the one end surface 31 to the other end surface 32) of the honeycomb structure portion 36, since the buffer portion 35 is arranged in each notch 34, a pressure loss at the time of passing a fluid to the honeycomb structure 300 may be increased in some cases. On the other hand, when each notch 34 has a length that is equal to or below 99% of the length of the honeycomb structure portion 36 in the central axis direction, since the notches 34 and the buffer portion 35 arranged in the notches 34 are not present in the range that is equal to or above 1% on the other end surface side of the honeycomb structure portion 36, an increase in pressure loss can be suppressed. Furthermore, in the honeycomb structure 300 depicted in FIG. 5 are provided the four parallel notches 4 formed at equal intervals and the three parallel notches 4 formed at equal intervals to be perpendicular to the four notches.

Figure 6:
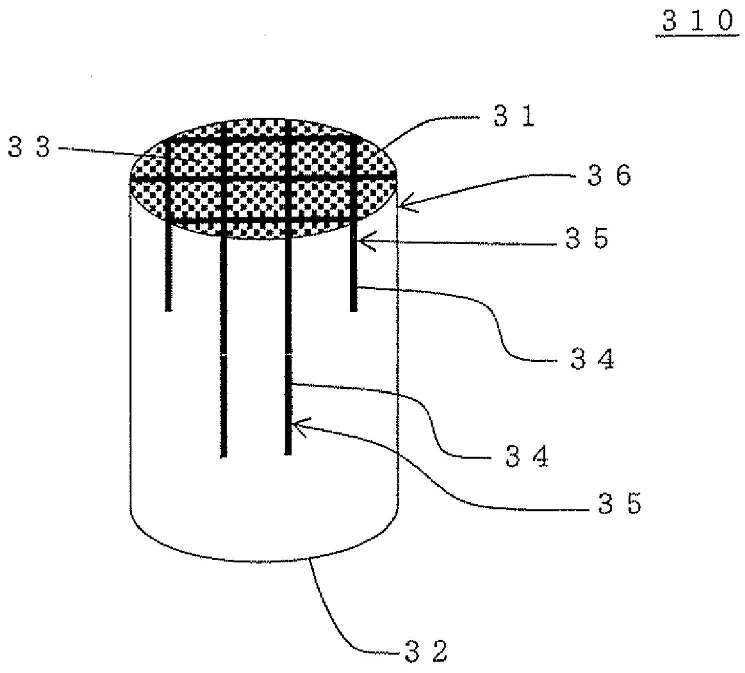
FIG. 6 is a perspective view schematically showing a honeycomb structure manufactured based on yet another embodiment of the manufacturing method of a honeycomb structure according to the present invention.

Moreover, as shown in FIG. 6, as to the notches 34, each notch running through a position near the central axis of the honeycomb structure 310 may have a long length in the central axis direction, and each notch running through a position near the outer periphery may have a short length in the central axis direction. It is to be noted that each notch running through the central axis is formed to have a long length in the central axis direction in the honeycomb structure 310 depicted in FIG. 6. When burning a particulate matter trapped in the honeycomb structure to be removed, since a portion around the central axis has a higher temperature than portions near the outer periphery, forming the honeycomb structure in this manner enables effectively avoiding a damage to the partial segments 33 near the central axis. Here, the notch running through the position near the central axis means a notch running through the range that is equal to or below 50% of a radius of an outer circle from the center in a cross section perpendicular to the central axis when the honeycomb structure has a cylindrical shape. FIG. 6 is a perspective view schematically showing a honeycomb structure manufactured based on still another embodiment of the manufacturing method for a honeycomb structure according to the present invention.

Additionally, like a honeycomb structure depicted in each of FIGS. 7 to 11, on one end surface having notches formed therein, it is preferable for one having the largest area in partial segments constituting an outer periphery of a honeycomb structure portion to have an area larger than the smallest area in remaining partial segments placed at a central portion of the honeycomb structure. When burning a particulate matter trapped by the honeycomb structure to be removed, since each remaining partial segment (a partial segment placed at the central portion) **33*b* has a higher temperature than each partial segment 33*a* constituting the outer periphery, arranging each partial segment having a small area at the central portion in this manner enables effectively avoiding a damage to each partial segment placed at the central portion. Here, "the partial segment placed at the central portion" means a partial segment excluding each partial segment constituting the outer periphery of the honeycomb structure portion from the entire partial segments. When an area of each partial segment placed at the central portion is small on one end surface in this manner, a pressure loss in the honeycomb structure tends to be increased, and hence it is particularly preferable for a length of each notch 34 in the central axis direction of the honeycomb structure portion 36 to be 25 to 75% of a length of the honeycomb structure portion 36 in the central axis direction. When the length of the notch 34 in the central axis direction of the honeycomb structure portion 36 is 75% or below, an increase in pressure loss can be prevented. In the honeycomb structure 320 depicted in FIG. 7, each partial segment 33***b* placed at the central portion on the one end surface 31 is smaller than each partial segment 33*a* constituting the outer periphery since each partial segment 33*b* has a finely partitioned square shape. In the honeycomb structure 330 depicted in FIG. 8, each partial segment 33*b* placed at the central portion on the one end surface 31 is smaller than each partial segment 33*a* constituting the outer periphery since it has a small partitioned fan-like shape. In the honeycomb structure 340 depicted in FIG. 9, each partial segment 33*b* placed at the central portion on the one end surface 31 is smaller than each partial segment 33*a* constituting the outer periphery since it has a finely partitioned rectangular shape. In the honeycomb structure 350 depicted in FIG. 10, each partial segment 33*b* placed at the central portion on the one end surface 31 is smaller than each partial segment 33*a* constituting the outer periphery since it has a finely partitioned square shape. In the honeycomb structure 360 depicted in FIG. 11, a partial segment 33*b* placed at the central portion on the one end surface 31 is smaller than the partial segment 33*a* constituting the outer periphery since it has a small partitioned circular shape. Each of FIGS. 7 to 11 is a plane view schematically showing the honeycomb structure manufactured based on yet another embodiment of the manufacturing method of a honeycomb structure according to the present invention from the one end surface side.

Figure 7:
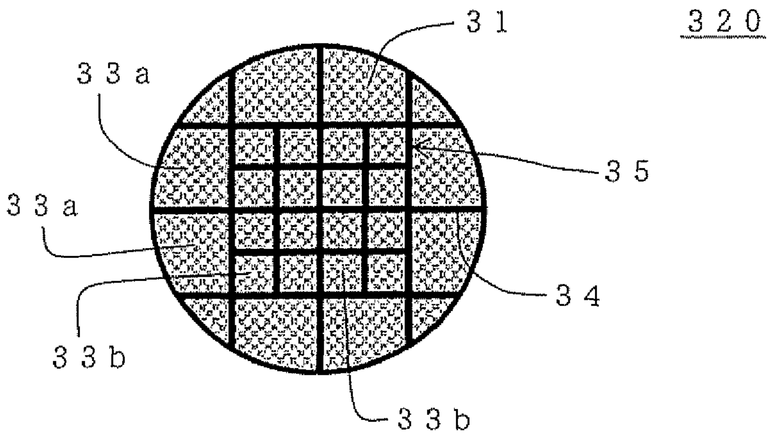
FIG. 7 is a plan view schematically showing from one end surface side a honeycomb structure manufactured based on a further embodiment of the manufacturing method of a honeycomb structure according to the present invention.
Figure 8:
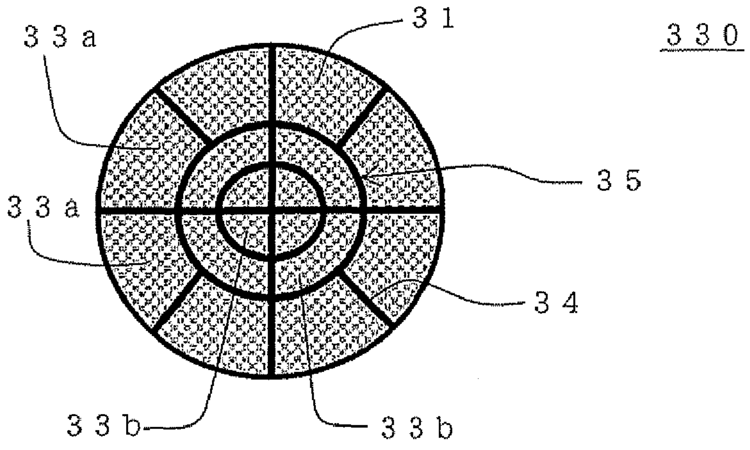
FIG. 8 is a plan view schematically showing from one fact side a honeycomb structure manufactured based on a still further embodiment of the manufacturing method of a honeycomb structure according to the present invention.
Figure 9:
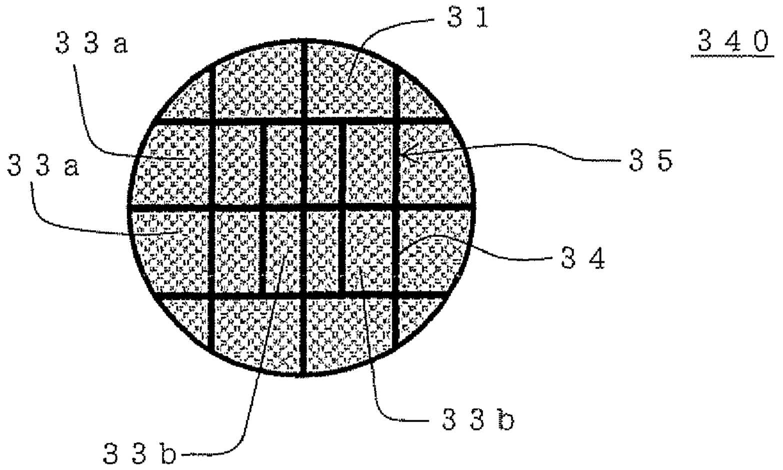
FIG. 9 is a plan view schematically showing from one end surface side a honeycomb structure manufactured based on a yet further embodiment of the manufacturing method of a honeycomb structure according to the present invention.
Figure 10:
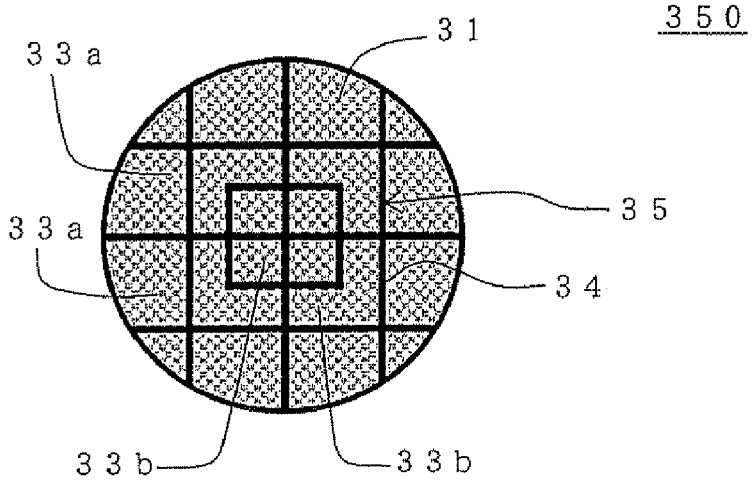
FIG. 10 is a plan view schematically showing from one end surface side a honeycomb structure manufactured based on another embodiment of the manufacturing method of a honeycomb structure according to the present invention.
Figure 11:
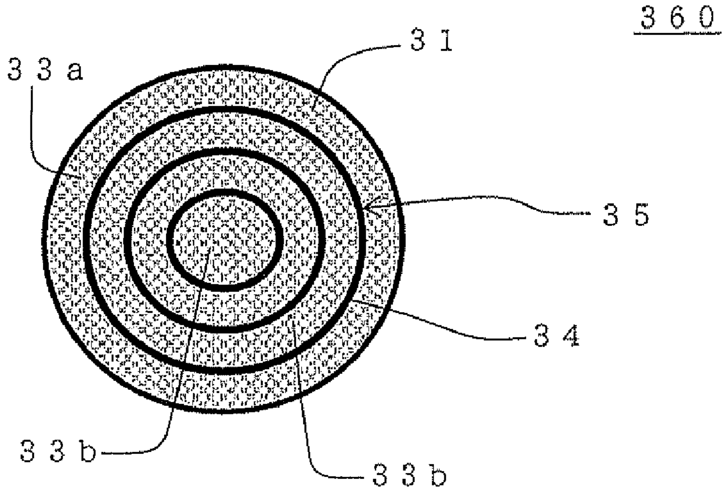
FIG. 11 is a plan view schematically showing from one end surface side a honeycomb structure manufactured based on still another embodiment of the manufacturing method of a honeycomb structure according to the present invention.

Here, on the one end surface 31 that is formed in the honeycomb structure portion 36 of the honeycomb structure 320 depicted in FIG. 7, when at least one of both end portions forms the notches 34 (closed structure notches) that do not reach the outermost peripheral portion of the honeycomb structure portion 36, using, e.g., an ultrasonic vibration blade scheme or a low-frequency vibration blade scheme is preferable. In notching processing based on the vibration blade scheme, a distal end of a rod-like or plate-like blade extended in a longitudinal direction or a cylindrical blade having the same cross-sectional shape as a cross-sectional shape of each notch (a shape of a cross section perpendicular to the central axis direction) in the longitudinal direction or the central axis direction is brought into contact with the one end surface 31 of the honeycomb formed body, and the honeycomb fired article is notched while subjecting the blade to ultrasonic vibration. Since the distal end of the rod-like, plate-like, or cylindrical blade is used to perform notching processing, a notch can be formed at any position on the one end surface 31 of the honeycomb fired article. As a processing device adopting the vibration blade scheme, a device having an article name "ultrasonic machine" manufactured by NDK-KK Co., Ltd. can be used. Further, notching processing based on the low-frequency vibration blade scheme can be carried out like the ultrasonic vibration blade scheme. As a difference between the ultrasonic vibration blade scheme and the low-frequency blade scheme, the blade is vibrated by ultrasonic waves in the ultrasonic blade scheme, whereas the blade is vibrated by using, e.g., an eccentric motor, a cam mechanism, or an eccentric spindle mechanism in the low-frequency vibration blade scheme.

Figure 13A:
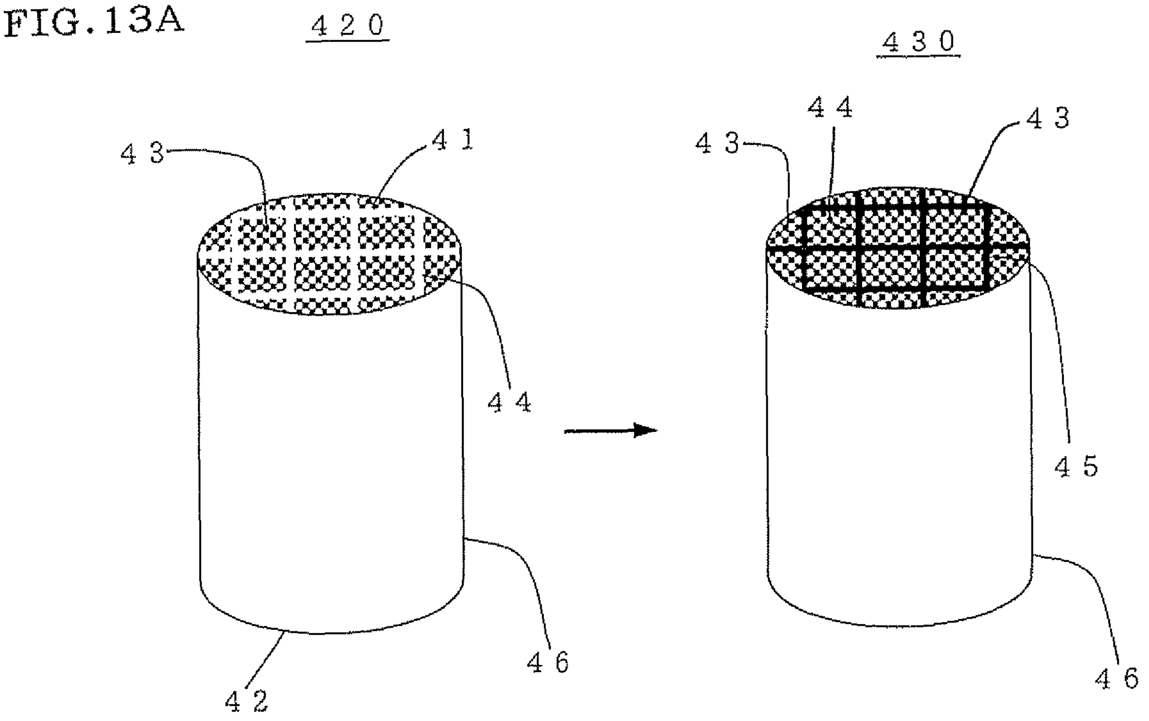
FIG. 13A is a perspective view schematically showing a process of forming a honeycomb structure in another embodiment of the manufacturing method of a honeycomb structure according to the present invention.

(5) Further Embodiment of Manufacturing Method of Honeycomb Structure:

According to a further embodiment of the manufacturing method of a honeycomb structure of the present invention, a honeycomb formed body 100 (or a plugged honeycomb formed body 110) (see FIG. 1) is manufactured by the same method as an embodiment of the manufacturing method of a honeycomb structure according to the present invention explained above, notches 44 extended from one end surface 41 toward the other end surface 42 in parallel to a central axis are formed in the obtained honeycomb formed body to partition a plurality of partial segments 43 without cutting the outermost peripheral portion 46 as shown in FIG. 13A to thereby form a partial segment aggregate 420, and a buffer portion 45 is formed between the respective partial segments adjacent to each other by the same method as an embodiment of the manufacturing method of a honeycomb structure according to the present invention explained above to obtain a honeycomb structure 430. According to the manufacturing method of a honeycomb structure of this embodiment, since the outermost peripheral portion 46 remains without being cut when forming the notches 44 in the honeycomb formed body, an outer peripheral wall having no notch is formed in the obtained honeycomb structure to surround all of the plurality of partial segments, and the buffer portion is not exposed to the outermost peripheral portion. Therefore, outer periphery grinding processing and outer periphery coating processing do not have to be performed, and a production efficiency can be further improved. Moreover, when further reducing irregularities on the outer peripheral surface and forming a more smooth outer peripheral surface is desired, performing the outer periphery grinding processing and/or the outer periphery coating processing is preferable. The outermost peripheral portion remaining without being cut in this manner serves as the outer peripheral wall in the obtained honeycomb structure. When forming the notches, as shown in FIG. 13A, each partial segment placed on the outermost side may have a shape connected with the outermost peripheral portion, or an inner portion (the inside) may be cut out circularly along the outermost peripheral portion so that each partial segment placed on the outermost side and the outermost peripheral portion are separated from each other.

As a thickness of the outermost peripheral portion remaining without being unit, a value of 0.1 to 4.0 mm is preferable, and a value of 0.3 to 1.0 mm is more preferable. When the thickness is smaller than 0.1 mm, the outermost peripheral portion may be apt to be cracked at the time of, e.g., using the obtained honeycomb structure in a subsequent process after forming the notches. Additionally, when the thickness is larger than 4.0 mm, a pressure loss may be increased.

As a method of forming the notches that partition the inside of the honeycomb formed body while leaving the outermost peripheral portion 46 without being cut, it is preferable to use the same method as the method of forming the "closed structure notches" formed in the honeycomb structure portion 36 of the honeycomb structure 320 depicted in FIG. 7. Using this method enables forming the notches to partition the plurality of partial segments while leaving the outermost peripheral portion without being cut.

Figure 13B:
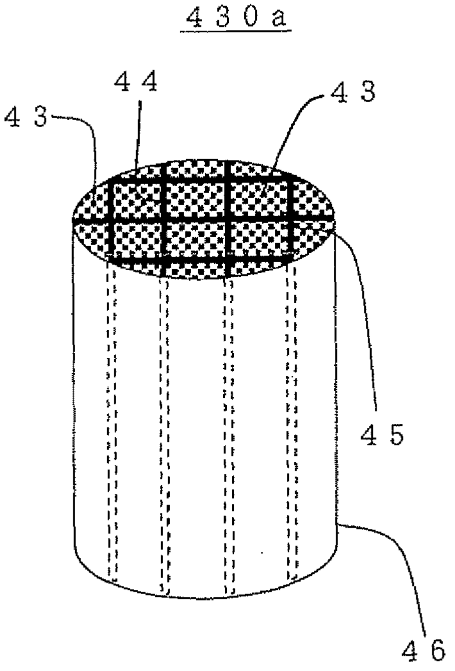
FIG. 13B is a perspective view schematically showing a honeycomb structure manufactured based on still another embodiment of the manufacturing method of a honeycomb structure according to the present invention.
Figure 13C:
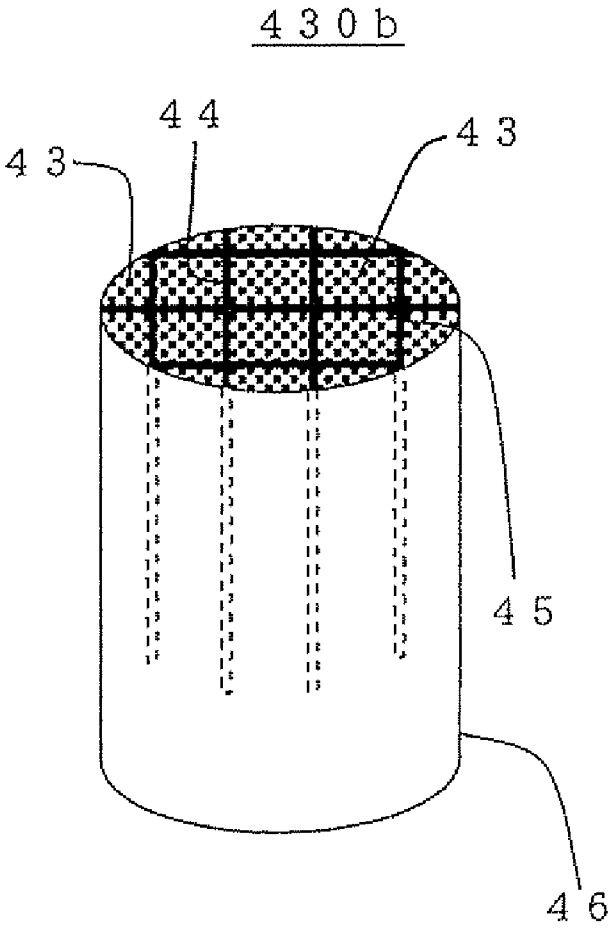
FIG. 13C is a perspective view schematically showing a honeycomb structure manufactured based on yet another embodiment of the manufacturing method of a honeycomb structure according to the present invention.

Further, in the manufacturing method of a honeycomb structure according to this embodiment, the notches to be formed may be notches that reach the other end surface from the one end surface like the example of the partial segment aggregate 120 depicted in FIG. 1, or they may be notches that are left without cutting the other end surface side like the example of the partial segment aggregate 220 depicted in FIG. 2. When the notches reaching the other end surface from the one end surface are formed, the resultant honeycomb structure has a structure like a honeycomb structure 430*a* depicted in FIG. 13B. When the notches which are left without cutting the other end surface side are formed, the resultant honeycomb structure has a structure like a honeycomb structure 430 depicted in FIG. 13C. Each of FIGS. 13B and 13C is a perspective view schematically showing the honeycomb structure manufactured based on a still further embodiment of the manufacturing method of a honeycomb structure according to the present invention. When the notches reach the other end surface from the one end surface, it is preferable to form the notches and the buffer portion while grasping the partial segments and the outermost peripheral portion by using a gripper. Furthermore, when the notches are left without cutting the other end surface side, it is preferable to cut off the other end surface side which is left without having notches formed therein in such a manner that a cutting plane becomes parallel to one fact, thereby forming the honeycomb structure in which the buffer portion is formed in the notches reaching the other end surface from the one end surface. In this case, when cutting off the other end surface side which is left without having notches formed therein, it is preferable to also cut off the outermost peripheral portion so that the single cutting plane can be formed.

(6) Yet Further Embodiment of Manufacturing Method of Honeycomb Structure

Figure 14:
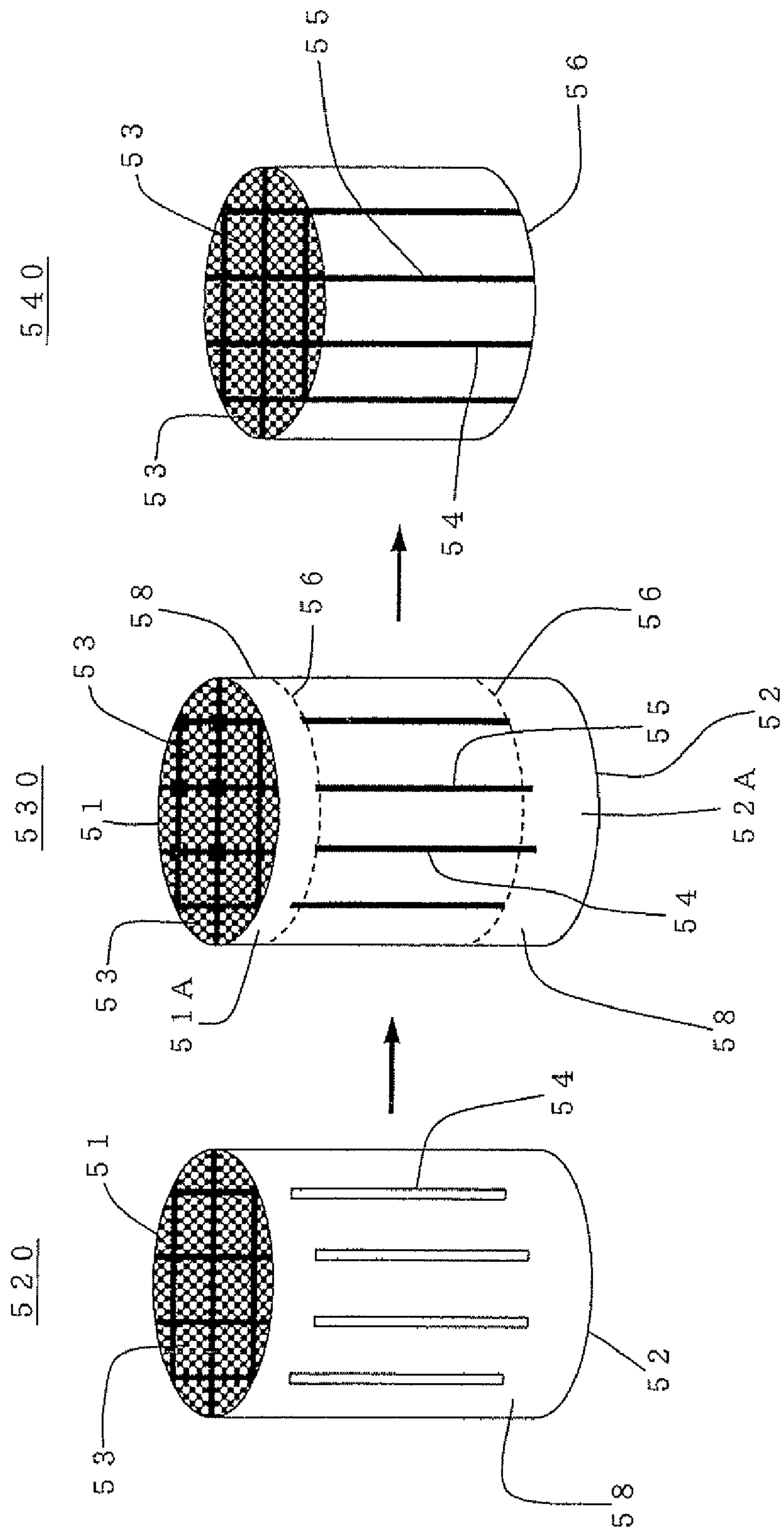
FIG. 14 is a perspective view schematically showing a process of forming a honeycomb structure in a further embodiment of the manufacturing method of a honeycomb structure according to the present invention.

According to a yet further embodiment of the manufacturing method of a honeycomb structure of the present invention, a honeycomb formed body 100 (or a plugged honeycomb formed body 110) (see FIG. 1) is manufactured by the same method as an embodiment of the manufacturing method of a honeycomb structure according to the present invention explained above, a plurality of notches 54 are formed in a central portion in a central axis direction while leaving both end portions 51 and 52 without being cutting off to thereby form an aggregate 520 of partial segments 53 as shown in FIG. 14, and a buffer portion 55 is formed between the respective partial segments 53 in the partial segment aggregate 520 to form a buffer portion arranged partial segment 530. Both end portions (one end portion 51A and the other end portion 52A) which are left without having the notches 54 formed therein are cut off in such a manner that a cutting plane 56 becomes parallel to the one end surface 51, thereby obtaining a honeycomb structure 540 in which the buffer portion 55 is formed in the notches 54 reaching the other end surface from one end surface. In the buffer portion arranged partial segment 530, both the end portions 51A and 52A which are left without having the notches 54 formed therein are non-notched portions 58 and 58. According to the manufacturing method of a honeycomb structure of this embodiment, since both the end portions 51A and 52A are determined as the non-notched portions 58 and 58 in this manner, processing from formation of the notches to formation of the buffer portion can be stably carried out, thereby improving a production efficiency. FIG. 14 is a perspective view schematically showing a process of forming the honeycomb structure in a yet further embodiment of the manufacturing method of a honeycomb structure according to the present invention.

In the manufacturing method of a honeycomb structure according to this embodiment, the notches must be formed from a side surface of the honeycomb formed body. As a method of forming the notches, it is preferable to use, e.g., the ultrasonic vibration blade scheme or the low-frequency vibration blade scheme which is utilized when forming the closed structure notches in the honeycomb structure portion 36 of the honeycomb structure 320 depicted in FIG. 7.

In the manufacturing method of a honeycomb structure according to this embodiment, it is preferable to form the buffer portion arranged partial segment 530 and cut off the non-notched portions 58 and 58 by the same method under the same conditions as those in another embodiment of the manufacturing method of a honeycomb structure (the manufacturing method of the honeycomb structure 240) according to the present invention depicted in FIGS. 2 and 3.

(7) Another Embodiment of Manufacturing Method of Honeycomb Structure:

According to another embodiment of the manufacturing method of a honeycomb structure of the present invention, a honeycomb formed body 100 (or a plugged honeycomb formed body 110) (see FIG. 1) is manufactured by the same method as that in an embodiment of the manufacturing method of a honeycomb structure according to the present invention explained above, and a plurality of notches 54 are formed in the obtained honeycomb formed body while leaving both end portions 51 and 52 without being cut off to thereby form an aggregate 520 of partial segments 53 as shown in FIG. 14. A buffer portion 55 is formed between the respective partial segments 53 in the partial segment aggregate 520 to form a buffer portion arranged partial segment 530, and this buffer portion arranged partial segment 530 is determined as a honeycomb structure that is final product. Therefore, the honeycomb structure obtained by the manufacturing method of the honeycomb structure according to this embodiment has the same structure as the buffer portion arranged partial segment 530 depicted in FIG. 14 and a partition wall that partitions a plurality of cells that serve as flow paths for a fluid and are extended from one end surface 51 to the other end surface 52, and includes a honeycomb structure portion in which the plurality of partial segments 53 are partitioned by the plurality of notches 54 which are formed and extended in the central axis direction while leaving both the end portions 51 and 52 without being cut off and the buffer portion 55 arranged in the entire notches 54. Such a honeycomb structure can be preferably used as a catalyst carrier or a filter.

In the honeycomb structure obtained by the manufacturing method of a honeycomb structure according to this embodiment, as a length of each notch 54 in the central axis direction of the honeycomb structure portion, a value of 70 to 98% is preferable. When this length is smaller than 70%, the honeycomb structure may be apt to be damaged due to a thermal shock during use. When the length is larger than 98%, a pressure loss may become too large in some cases. Further, it is preferable for a distance from the one end surface 51 of the notches 54 to the notches 54 to be one to 15% of a length of the honeycomb structure in the central axis direction. When this distance is smaller than one %, an effect of suppressing an increase in pressure loss may be reduced. When this distance exceeds 15%, thermal shock resistance may be decreased.

EXAMPLES

Although the present invention will now be further specifically explained hereinafter based on examples, but the present invention is not restricted to these examples.

Example 1

As a ceramics raw material, an SiC powder and a metal Si powder were mixed at a mass ratio of 80:20, methyl cellulose and hydroxypropoxymethyl cellulose as molding aid materials, and starch, a hygroscopic resin, a surface active agent, and water as pore forming materials were added to this mixture to be kneaded, and kneaded clay was manufactured by using a vacuum clay kneader.

The obtained cylindrical kneaded clay was formed into a honeycomb shape by using an extruder, dried by high-frequency dielectric heating, and then dried at 120° C. for two hours by using a hot-air dryer. Both end surfaces were cut off for a predetermined amount to obtain a cylindrical honeycomb formed body having a partition wall thickness of 310 μm, a cell density of 46.5 cells/cm$^2$ (300 cells/square inch), a bottom surface diameter of 145 mm, and a length of 155 mm. It is to be noted that an entire partition wall in the honeycomb formed body was formed to have a uniform thickness without forming a thick-walled portion.

End portions of respective cells in the obtained honeycomb formed body were plugged in such a manner that cells adjacent to each other are plugged at end portions opposite to each other and both end surfaces have a checkered pattern. As a filler for plugging, the same material as that of the honeycomb formed body was used.

After plugging, the plugged honeycomb formed body was dried at 120° C. for five hours by using a hot-air dryer, then degreased at approximately 450° C. for five hours in an air atmosphere by using an atmospheric furnace having a deodorizer, and fired in an Ar inert atmosphere for approximately 1450° C. for five hours, thereby obtaining a plugged porous honeycomb fired article having SiC crystal grains coupled through Si. In the honeycomb fired article, an average pore diameter was 13 μm, and a porosity was 41. The average pore diameter is a value obtained by measurement using a mercury porosimeter, and the porosity is a value obtained by measurement based on the Archimedes method.

Figure 12:
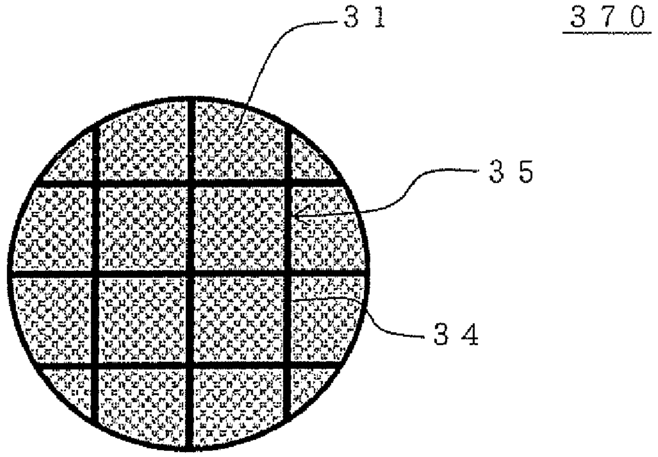
FIG. 12 is a plan view schematically showing from one end surface side of a honeycomb structure manufactured in Example 1.

The obtained honeycomb fired article was notched to form an aggregate of partial segments. The notching processing was performed by using a discoid multi-grinding stone (an article name: high-speed flat-surface grinding machine manufactured by ELB). Like the honeycomb structure depicted in FIG. 12, three parallel notches and three parallel notches orthogonal to these three notches were formed in one end surface of the honeycomb fired article, thus forming 16 partial segments (a notch pattern: 3×3). An interval between the respective parallel notches was set to 36 mm. A length (a notch depth) of each notch in the central axis direction of the honeycomb fired article (a structure portion) was set to 25% of a length of the honeycomb fired article in the central axis direction. All the notches had the same notch depth. A width of each notch was set to one mm. FIG. 12 is a plan view schematically showing a honeycomb structure manufactured in Example 1 from the one end surface side.

The notches in the partial segment aggregate were filled with a slurry-like filler to form a buffer portion 5, thus obtaining a honeycomb structure. As the filler, a mixture of aluminosilicate inorganic fibers and SiC particles was used. As the slurry containing the filler, a material containing 30 parts by weight of water, 30 parts by weight of the aluminosilicate inorganic fibers, and 30 parts by weight of the SiC particles with respect to 100 parts by weight of the filler was used. When filling the notches with the slurry, the partial segment aggregate was fixed by using such a gripper 21 as shown in FIG. 4A, this was put into a hermetically-plugged container, a tape containing polyester as a base material (manufactured by Scotch) was wound on an outer periphery to prevent leakage of the slurry from the outer periphery, and then the slurry was pressed into the notches. A regeneration limit value (g/liter) and a pressure loss (%) of the obtained honeycomb structure were measured based on the following method. Further, a raw material yield was obtained. The raw material yield is represented as a ratio of a mass of the honeycomb structure after outer periphery processing (rough processing, grinding) with respect to a mass of the honeycomb structure before the outer periphery processing (rough processing, grinding). Table 1 shows a result.

(Regeneration Limit Value)

The honeycomb structure is used as a DPF, a deposition amount of soot is gradually increased to perform regeneration (combustion of soot), and a limit of occurrence of a crack is confirmed. First, a non-expandable mat formed of ceramic as a holding material is wound on the outer periphery of the honeycomb structure, and this structure is pushed into a can body for canning formed of SUS409, thereby obtaining a canning structure. Subsequently, a combustion gas containing soot produced by combustion of a diesel fuel oil is flowed in from one end surface of the honeycomb structure and flowed out from the other end surface to deposit soot in the honeycomb structure. Further, the honeycomb structure is once cooled to a room temperature, then a combustion gas containing a fixed percentage of oxygen is flowed in from the one end surface of the honeycomb structure at 680° C. Soot is rapidly burned by reducing a flow volume of the combustion gas when a pressure loss in the honeycomb structure is decreased, and then presence/absence of occurrence of a crack in the DPF is confirmed. This test begins when a deposition amount of soot is four g/L, and it is repeatedly conducted while increasing the deposition amount by 0.5 g/L each time until occurrence of a crack is recognized.

Measurement results of the regeneration limit value shown in Table 1 indicate values based on measurement results of a honeycomb structure according to Example 5 (an example where a notch depth is equal to a length of the honeycomb structure in the central axis direction (a state where the partial segments are respectively completely separated from each other)). That is, the table shows each value obtained by subtracting a measurement result of the regeneration limit value (g/liter) of the honeycomb structure according to Example 5 from a measurement result (an average value when each honeycomb structure is measured five times) of the regeneration limit (an amount of soot at the time of occurrence of an initial crack) of each honeycomb structure.

(Pressure Loss)

A pressure loss of the honeycomb structure is measured by using an evaluation criterion wind tunnel (a pressure loss measurement device for a filter disclosed in JP-A-2005-172652). A flow volume of a fluid in this measurement was set to 10 Nm$^3$/minute and an experiment temperature was set to 25° C. Measurement results of the pressure loss shown in Table 1 indicate values based on measurement results of the honeycomb structure according to Example 5 (an example where a notch depth is equal to a length of the honeycomb structure in the central axis direction (a state where the partial segments are respectively completely separated from each other)). That is, this table shows each value obtained by subtracting a measurement result of the pressure loss of the honeycomb structure according to Example 5 from a measurement result (an average value when each honeycomb structure is measured five times) of the pressure loss of each honeycomb structure as a ratio for a measurement result of the pressure loss in the honeycomb structure according to Example 5.

TABLE 1

| | Notch pattern | Notch depth (%) | Regen-eration limit value (g/liter) | Pressure loss (%) | Raw material yield (%) |
|---|---|---|---|---|---|
| Example 1 | 3 × 3 | 25 | 0 | −5.8 | 100 |
| Example 2 | 3 × 3 | 50 | 0 | −5.6 | 100 |
| Example 3 | 3 × 3 | 75 | 0 | −5.5 | 100 |
| Example 4 | 3 × 3 | 99 | 0 | −5.4 | 100 |
| Example 5 | 3 × 3 | 100 | 0 | 0 | 100 |
| Example 6 | Segmentation of central portion | 25 | +1 | −0.4 | 100 |
| Example 7 | Segmentation of central portion | 50 | +1 | −0.2 | 100 |
| Example 8 | Segmentation of central portion | 75 | +1 | −0.1 | 100 |
| Example 9 | Segmentation of central portion | 99 | +1 | 0 | 100 |
| Example 10 | Segmentation of central portion | 100 | +1 | 5.4 | 100 |
| Comparative Example 1 | — | — | −2 | −10.3 | 100 |
| Comparative Example 2 | 3 × 3 | — | 0 | 0 | 74 |

Example 2

A honeycomb structure was manufactured in the same manner as Example 1 except that a notch depth was set to 50% of a length of a honeycomb fired article in a central axis direction. Like Example 1, a regeneration limit value (g/liter) and a pressure loss (%) were measured. Furthermore, a raw material yield was also obtained. Table 1 shows results.

Example 3

A honeycomb structure was manufactured in the same manner as Example 1 except that a notch depth was set to 75% of a length of a honeycomb fired article in a central axis direction. Like Example 1, a regeneration limit value (g/liter) and a pressure loss (%) were measured. Furthermore, a raw material yield was also obtained. Table 1 shows results.

Example 4

A honeycomb structure was manufactured in the same manner as Example 1 except that a notch depth was set to 99% of a length of a honeycomb fired article in a central axis direction. Like Example 1, a regeneration limit value (g/liter) and a pressure loss (%) were measured. Furthermore, a raw material yield was also obtained. Table 1 shows results.

Example 5

A honeycomb structure was manufactured in the same manner as Example 1 except that a notch depth was set to 100% of a length of a honeycomb fired article in a central axis direction. Like Example 1, a regeneration limit value (g/liter) and a pressure loss (%) were measured. Furthermore, a raw material yield was also obtained. Table 1 shows results.

Example 6

A honeycomb structure was manufactured in the same manner as Example 1 except that a notch formation pattern similar to that in the honeycomb structure 320 depicted in FIG. 7 was adopted. Six notches reaching an outer peripheral portion (three notches aligned in parallel and three notches perpendicular to these three notches on one end surface) were formed by notching processing based on a method using a discoid multi-grinding stone whose article name is high-speed flat-surface grinding machine manufactured by ELB. Moreover, on the one end surface, notches formed to quadrisect (segment) each of four square partial segments that are partitioned by the six notches and include no outer periphery (a notch pattern: segmentation of central portion) were obtained by notching processing based on a method using an ultrasonic blade saw whose article name is ultrasonic machine manufactured by NDK-KK Co., Ltd. The honeycomb structure was manufactured in such a manner that an area of each segmented partial segment on the one end surface can be smaller than the largest area of the partial segment constituting the outer periphery of the honeycomb structure portion on the one end surface. It is to be noted that a notch depth was set to 25% of a length of a honeycomb fired article in a central axis direction. Like Example 1, a regeneration limit value (g/liter) and a pressure loss (%) of the obtained honeycomb structure were measured. Furthermore, a raw material yield was also obtained. Table 1 shows results.

Example 7

A honeycomb structure was manufactured in the same manner as Example 6 except that a notch depth was set to 50% of a length of a honeycomb fired article in a central axis direction. Like Example 1, a regeneration limit value (g/liter) and a pressure loss (%) were measured. Furthermore, a raw material yield was also obtained. Table 1 shows results.

Example 8

A honeycomb structure was manufactured in the same manner as Example 6 except that a notch depth was set to 75% of a length of a honeycomb fired article in a central axis direction. Like Example 1, a regeneration limit value (g/liter) and a pressure loss (%) were measured. Furthermore, a raw material yield was also obtained. Table 1 shows results.

Example 9

A honeycomb structure was manufactured in the same manner as Example 6 except that a notch depth was set to 99% of a length of a honeycomb fired article in a central axis direction. Like Example 1, a regeneration limit value (g/liter) and a pressure loss (%) were measured. Furthermore, a raw material yield was also obtained. Table 1 shows results.

Example 10

A honeycomb structure was manufactured in the same manner as Example 6 except that a notch depth was set to 100% of a length of a honeycomb fired article in a central axis direction. Like Example 1, a regeneration limit value (g/liter) and a pressure loss (%) were measured. Furthermore, a raw material yield was also obtained. Table 1 shows results.

Comparative Example 1

A honeycomb structure was manufactured in the same manner as Example 1 except that notches were not formed and a buffer portion 5 was not provided. Like Example 1, a regeneration limit value (g/liter) and a pressure loss (%) were measured. Furthermore, a raw material yield was also obtained. Table 1 shows results.

Comparative Example 2

Based on the same method as Example 1, 16 rectangular solid honeycomb segments each having a size of 36 square mm and a length of 155 mm (a partition wall thickness of 310 μm and a cell density of 46.5 cells/cm$^2$ (300 cells/square inch)) were manufactured. The obtained honeycomb segments were bonded by using a bonding machine to fabricate one large rectangular solid (a size of 147 square mm and a length of 155 mm) bonded body. An outer periphery of the obtained bonded body was subjected to rough processing and grinding to acquire a cylindrical honeycomb structure having a bottom surface diameter of 145 mm and a length of 155 mm. An end surface pattern of the obtained honeycomb structure was set to be equal to the end surface pattern of the honeycomb structure depicted in FIG. 12. Like Example 1, a regeneration limit value (g/liter) and a pressure loss (%) were measured. Furthermore, a raw material yield was also obtained. Table 1 shows results.

It can be understood from Table 1 that a regeneration limit value is an excellent value (a value close to that of the honeycomb structure according to Example 5 or Example 10) when a notch depth is equal to or above 25%. Moreover, it can be understood that the honeycomb structure having a notch depth set to 25 to 95% has a lower pressure loss than that of the honeycomb structure having a notch depth set to 100%. Additionally, it is revealed from the evaluation results of the honeycomb structures according to Examples 6 to 10 that the regeneration limit value becomes a higher value than that of the honeycomb structure according to Example 5 when the partial segments including no outer periphery are segmented to have an area smaller than the largest area of the partial segments constituting the outer periphery of the honeycomb structure portion on the one end surface. Additionally, it can be understood that setting a segment depth to 25 to 75% to prevent the pressure loss from becoming too high is preferable since the pressure loss tends to be entirely increased when the partial segments including no outer periphery are segmented. Further, a raw material yield in the manufacturing method of the honeycomb structure according to Example 5 is very excellent as compared with a raw material yield in the manufacturing method of the honeycomb structure according to Comparative Example 2 in which the plurality of segments are bonded and then subjected to rough processing and grinding.

An isostatic breakdown strength (which will be referred to as an isostatic strength) of the honeycomb structure according to Example 3 was measured based on the following method. Table 2 shows results.

TABLE 2

| | Space in buffer portion | | Isostatic strength |
|---|---|---|---|
| | Position | Length (mm) | (MPa) |
| Example 3 | — | 0 | 7.5 |
| Comparative Example 3 | From end surface | 5 | 6.1 |
| Comparative Example 4 | | 10 | 5.7 |
| Comparative Example 5 | | 20 | 4.5 |
| Comparative Example 6 | | 50 | 2.2 |
| Comparative Example 7 | From central portion | 5 | 6.3 |
| Comparative Example 8 | | 10 | 6.1 |
| Comparative Example 9 | | 20 | 5.2 |
| Comparative Example 10 | | 50 | 3.8 |

(Isostatic Strength)

An urethane rubber sheet having a thickness of 0.5 mm (a specification: urethane 90° natural) is wound on an outer periphery of a honeycomb structure, an aluminum circular plate having a thickness of 20 mm is arranged on each of both end surfaces to sandwich the circular urethane sheet therebetween, and a space between an outer periphery of each aluminum circulate plate and the urethane rubber sheet is plugged by winding a vinyl tape on the outer periphery of each aluminum circular plate, thereby obtaining a test sample. A radius of the aluminum circular plate and the urethane rubber sheet arranged on each end surface are set to be equal to a radius of each end surface of the honeycomb structure. The manufactured test sample is put input a pressure container, a pressure is increased at a speed of 0.3 to 3.0 MPa/minute, and a pressure is recorded until the pressure starts dropping. A maximum pressure is determined as an isostatic strength (MPa). In this test, the honeycomb structure is destructed under a predetermined pressure when the sample is put into the pressure container and the pressure is increased, and the pressure is reduced when the honeycomb structure is destructed. Therefore, measuring the maximum pressure when the pressure is increased enables obtaining the isostatic strength.

Comparative Example 3

Figure 17:
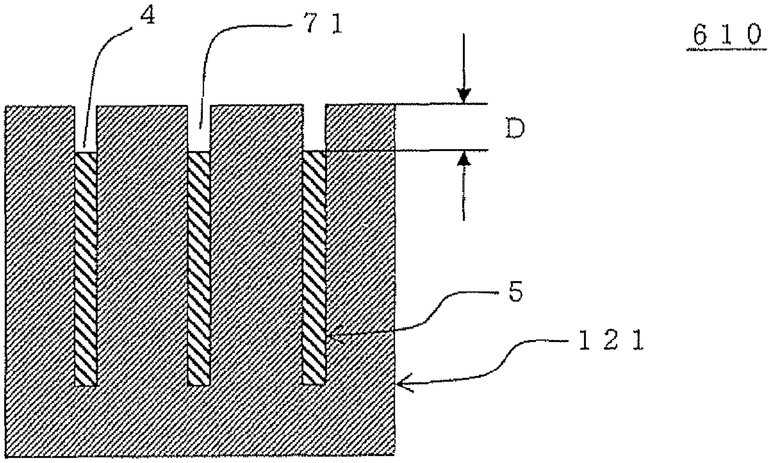
FIG. 17 is a schematic view showing a cross section of a honeycomb structure manufactured in Comparative Example 3 parallel to a central axis.

A honeycomb structure was manufactured in the same manner as Example 3 except that a paper sheet having a thickness of one mm was inserted into each notch to reach a depth of five mm from one end surface as a end surface having notches formed therein when filling the notches in a partial segment aggregate with a filler to form a buffer portion 5, a heat treatment was performed at approximately 600° C. to burn each paper sheet after forming the buffer portion 5, and a space was formed in each portion where the paper sheet was present. The obtained honeycomb structure has such a structure in which a space 71 is formed in each notch 4 in the partial segment aggregate 121 as shown in FIG. 17. FIG. 17 is a schematic view showing a cross section of a honeycomb structure 610 manufactured in Comparative Example 3 in parallel to a central axis. A depth D of the space 71 is five mm. An isostatic strength was measured in the same manner as Example 3. Table 2 shows results.

Comparative Examples 4 to 6

Each honeycomb structure was manufactured in the same manner as Comparative Example 3 except that a paper sheet was inserted from one end surface as a end surface having notches formed therein to reach a depth of 10 mm, 20 mm, or 50 mm when filling the notches in a partial segment aggregate with a filler to form a buffer portion 5 (Comparative Examples 4, 5, and 6). Isostatic strengths were measured in the same manner as Example 3. Table 2 shows results.

Comparative Example 7

Figure 18:
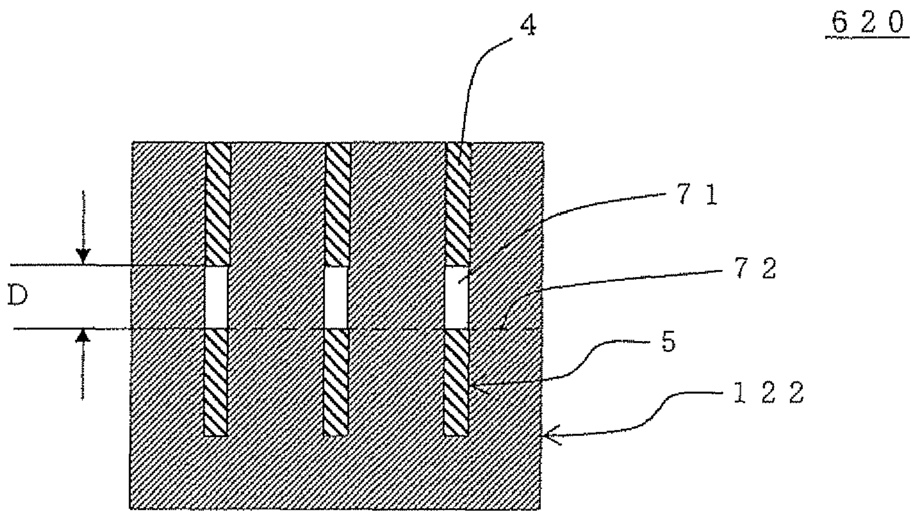
FIG. 18 is a schematic view showing a cross section of a honeycomb structure manufactured in Comparative Example 7 parallel to a central axis.

A honeycomb structure was manufactured in the same manner as Comparative Example 3 except that a position at which a paper sheet is inserted was set to a range that is five mm from a central portion 72 in a central axis direction of the honeycomb structure toward one end surface as a end surface having notches formed therein. The obtained honeycomb structure has such a structure as shown in FIG. 18, and a depth D of a space 71 formed in each notch 4 in a partial segment aggregate 122 is five mm. FIG. 18 is a perspective view showing a cross section of a honeycomb structure 620 manufactured in Comparative Example 7 in parallel to a central axis. An isostatic strength was measured in the same manner as Example 3. Table 2 shows results.

Comparative Examples 8 to 10

Each honeycomb structure was manufactured in the same manner as Comparative Example 7 except that a position at which a paper sheet is inserted was set to a range that is 10 mm, 20 mm, or 50 mm from a central portion in a central axis direction of the honeycomb structure toward one end surface as a end surface having notches formed therein (Comparative Examples 8, 9, and 10). Isostatic strengths ware measured in the same manner as Example 3. Table 2 shows results.

It can be understood from Table 2 that the honeycomb structure according to Example 3 has a higher isostatic strength than those of the honeycomb structures according to Comparative Examples 3 to 10 since a space is not formed in each slit. The high isostatic strength is advantageous in canning resistance.

The honeycomb structure according to the present invention can be preferably utilized as a carrier or a filter for a catalyst device that is used for, e.g., an environmental measure or recovery of specific materials. Further, the manufacturing method for a honeycomb structure according to the present invention can be utilized to efficiently manufacture such a honeycomb structure according to the present invention.

What is claimed is:

1. A manufacturing method of a honeycomb structure, comprising:

subjecting a raw material to extrusion forming to obtain a honeycomb formed body having a partition wall that partitions a plurality of cells that serve as flow paths for a fluid and are extended from one end surface to an other end surface;

forming a plurality of notches extended in a direction along which the cells are extended in the honeycomb formed body to form a partial segment aggregate in such a manner that a plurality of partial segments are partitioned; and forming a buffer portion between respective partial segments adjacent to each other in the partial segment aggregate to fill an entire space between the respective partial segments adjacent to each other, thereby obtaining a honeycomb structure; wherein a plurality of notches are formed in a central portion, located between two opposing end portions of the honeycomb formed body, in a central axis direction of the honeycomb formed body to form a partial segment aggregate while leaving both of the end portions uncut.

2. The manufacturing method of a honeycomb structure according to claim 1, wherein an outermost peripheral portion is left in the honeycomb formed body without being cut, and a plurality of notches extended in a direction along which the cells are extended are formed in the honeycomb formed body from the one end surface toward the other end surface to partition the plurality of partial segments, thereby forming the partial segment aggregate.

3. A manufacturing method of a honeycomb structure, comprising:

subjecting a raw material to extrusion forming to obtain a honeycomb formed body having a partition wall that partitions a plurality of cells that serve as flow paths for a fluid and are extended from one end surface to an other end surface;

forming a plurality of notches extended in a direction along which the cells are extended in the honeycomb formed body to form a partial segment aggregate in such a manner that a plurality of partial segments are partitioned; and forming a buffer portion between respective partial segments adjacent to each other in the partial segment aggregate to fill an entire space between the respective partial segments adjacent to each other, thereby obtaining a honeycomb structure; wherein a plurality of notches are formed in a central portion, located between opposing two end portions of the honeycomb formed body, in a central axis direction of the honeycomb formed body to form the partial segment aggregate while leaving both of the end portions uncut, and a buffer portion is formed between respective partial segments in the partial segment aggregate, and both of the end portions which are left without having the notches formed therein are cut off in such a manner that a cutting plane becomes parallel to the one end surface, thereby obtaining a honeycomb structure having the buffer portion formed in the notches reaching the other end surface from the one end surface.

* * * * *